(12) United States Patent
Helmrich et al.

(10) Patent No.: US 11,122,300 B2
(45) Date of Patent: Sep. 14, 2021

(54) SPECTRALLY ADAPTIVE NOISE FILLING TOOL (SANFT) FOR PERCEPTUAL TRANSFORM CODING OF STILL AND MOVING IMAGES

(71) Applicant: Fraunhofer-Gesellschaft zur Förderung der angewandten Forschung e.V., Munich (DE)

(72) Inventors: Christian Helmrich, Berlin (DE); Paul Keydel, Berlin (DE); Sebastian Bosse, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/000,459

(22) Filed: Aug. 24, 2020

(65) Prior Publication Data
US 2020/0389673 A1    Dec. 10, 2020

Related U.S. Application Data

(63) Continuation of application No. PCT/EP2019/054312, filed on Feb. 21, 2019.

(30) Foreign Application Priority Data

Feb. 27, 2018    (EP) ..................... 18158985

(51) Int. Cl.
*H04N 11/02*    (2006.01)
*H04N 19/86*    (2014.01)
(Continued)

(52) U.S. Cl.
CPC .......... *H04N 19/86* (2014.11); *H04N 19/124* (2014.11); *H04N 19/176* (2014.11); *H04N 19/60* (2014.11)

(58) Field of Classification Search
CPC ..................................... H04N 19/86
(Continued)

(56) References Cited

U.S. PATENT DOCUMENTS 5,479,211 A * 12/1995 Fukuda ............... H04N 19/503
                                                348/699
2004/0114817 A1* 6/2004 Jayant ................. H04N 19/126
                                                382/239
(Continued)

FOREIGN PATENT DOCUMENTS

WO    2013040336 A1    3/2013

OTHER PUBLICATIONS

T. Ebrahimi et al., "Summary and Next Steps for the Image Compression Challenge," in Proc. IEEE Int. Conf. Image Process. (ICIP), Phoenix, USA, Sep. 2016.
(Continued)

*Primary Examiner* — Leron Beck
(74) *Attorney, Agent, or Firm* — McClure, Qualey & Rodack, LLP

(57) ABSTRACT

Examples are provided for apparatus and methods for video encoding and decoding. An encoder apparatus for encoding a picture into a data stream is configured to: subject a transform of a block of the picture to quantization to obtain a quantized transform; determine a zero-quantized portion of the quantized transform; determine at least one noise parameter providing noise information on the transform within the zero-quantized portion; signal the quantized transform and the at least one parameter.

15 Claims, 6 Drawing Sheets

(51) Int. Cl.
*H04N 19/124* (2014.01)
*H04N 19/176* (2014.01)
*H04N 19/60* (2014.01)

(58) Field of Classification Search
USPC .......................................... 375/240.01–240.29
See application file for complete search history.

(56) References Cited

U.S. PATENT DOCUMENTS

| | | | | |
|---|---|---|---|---|
| 2006/0050157 | A1* | 3/2006 | Tsuruoka | H04N 5/21 348/241 |
| 2006/0133686 | A1 | 6/2006 | Gomila et al. | |
| 2012/0127350 | A1* | 5/2012 | Alfonso | H04N 5/21 348/241 |
| 2012/0230395 | A1* | 9/2012 | Kerofsky | H04N 19/44 375/240.03 |
| 2013/0006622 | A1* | 1/2013 | Khalil | G10L 19/012 704/233 |
| 2013/0114685 | A1* | 5/2013 | Kerofsky | H04N 19/126 375/240.03 |
| 2015/0332686 | A1* | 11/2015 | Disch | G10L 19/04 704/226 |

OTHER PUBLICATIONS

A. Dumitraş et al., "An Encoder-Decoder Texture Replacement Method With Application to Content-Based Movie Coding," IEEE Trans. Circuits Syst. for Video Technology, vol. 14, No. 6, pp. 825-840, Jun. 2004, XP001196870.
B. T. Oh et al., "Synthesis-Based Texture Video Coding with Side Information," IEEE Trans. Circuits & Syst. for Video Technology, vol. 21, No. 5, pp. 647-659, May 2011, XP011480303.
B. Zhou et al., "Compact Representation for Dynamic Texture Video Coding Using Tensor Method," IEEE Transactions on Circuits and Systems for Video Technology, vol. 23, No. 2, pp. 280-288, Feb. 2013, XP011492798.
J. C. K. Yan et al., "Film Grain Noise Removal and Generation for Color Images," in Acoustics, Speech and Signal Processing, 1998. Proceedings of the 1998 IEEE International Conference on Seattle, WA, USA May 12-15, 1998, vol. 5, pp. 2957-2960, XP010279377.
O. K. Al-Shaykh et al., "Lossy Compression of Noisy Images," IEEE Trans. Image Process., vol. 7, No. 12, pp. 1641-1652, Dec. 1998.
C. Gomila et al., "SEI message for film grain noise," Proc. 8th Meeting Joint Video Team, doc. JVT-H022, Geneva, Switzerland, pp. 1-14, May 2003.
I.-K. Kim et al., "HEVC Test Model 13 (HM 13) Encoder Description," JCTVC-O1002 and m31757, Geneva, 2013.
Int. Telecommunication Union (ITU), CCITT, Specification T.81, "Information Technology—Digital Compression and Coding of Continuous-Tone Still Images—Requirements and Guidelines," Geneva, Switzerland, Sep. 1992.
T. Ebrahimi et al., "Overview and Benchmarking Summary for the ICIP 2016 Compression Challenge," in Proc. IEEE Int. Conf. Image Process. (ICIP), Phoenix, USA, Sep. 2016.
ITU-T, Recommendation H.265 and ISO/IEC, Int. Standard 23008-2, "High efficiency video coding," Geneva, Switzerland, Jan. 2017, online: http://www.itu.int/rec/T-REC-H.265 (uploaded in 3 parts).
P. Campisi et al., A Perceptually Lossless, Model-Based, Texture Compression Technique, IEEE Transactions on Image Processing, 20000801 IEEE Service Center, Piscataway, NJ, US, vol. 9, No. 8, pp. 1325-1336, XP000954684.
P. Ndjiki-Nya et al., Improved H.264/AVC coding using texture analysis and synthesis, Proceedings 2003 International Conference on Image Processing (CAT. No. 03CH37429), Barcelona, Spain, Sep. 14-17, 2003; [International Conference on Image Processing], Sep. 14, 2003; Sep. 14, 2003-Sep. 17, 2003 IEEE, IEEE Piscataway, NJ, USA, vol. 3, pp. 849-852, Institute of Electrical and Electronics Engineers, XP010669967.
J. Ballé et al., "Component-Based Image Coding Using Non-Local Means Filtering and an Autoregressive Texture Model," in Proc. IEEE ICIP, pp. 1937-1940, Nov. 2009, XP031629188.
J. Ballé et al., "Models for Static and Dynamic Texture Synthesis in Image and Video Compression," IEEE Journal of Selected Topics in Signal Process, 2011, XP01136310.
H. Xu et al., "Manifold Based Dynamic Texture Synthesis from Extremely Few Samples," in Proc. IEEE Conf. Computer Vision and Pattern Recognition, Columbus, USA, pp. 3019-3026, Jun. 2014, XP032649282.
K. Naser et al., "Local Texture Synthesis: A Static Texture Coding Algorithm Fully Compatible With HEVC," 2015 International Conference on Systems, Signals and Image Processing (IWSSIP), Sep. 10, 2015 IEEE, pp. 37-40, XP032803510.
B. T. Oh et al., "Film Grain Noise Modeling in Advanced Video Coding," IEEE Trans. Circuits & Syst. for Video Technology, Dec. 2009.
J. Dai et al., "Film Grain Noise Removal and Synthesis in Video Coding," Acoustics Speech and Signal Processing (ICASSP), 2010 IEEE International Conference on, Mar. 14, 2010 IEEE, Piscataway, USA, pp. 890-893, XP031697220.
I. Hwang et al. "Enhanced Film Grain Noise Removal for High Fidelity Video Coding," 2013 International Conference on Information Science and Cloud Computing Companion, Dec. 7, 2013 IEEE, XP032696763.
T. Sun et al. "DCT Coefficients Generation Model for Film Grain Noise and Its Application in Super-Resolution," 2014 IEEE International Conference on Image Processing (ICIP), Oct. 27, 2014 IEEE, pp. 3857-3861, XP032967304.
S. P. Lipshitz et al., "Quantization and Dither: A Theoretical Survey," J. Aud. Eng. Soc., vol. 40, No. 5, pp. 355-375, May 1992.
G. J. Sullivan, "Efficient Scalar Quantization of Exponential and Laplacian Random Variables," IEEE Transactions on Information Theory, Sep. 1, 1996 IEEE Press, USA, vol. 42, No. 5, pp. 1365-1374, XP000964056.
G. Fuchs et al., "Low Delay LPC and MDCT-Based Audio Coding in the EVS Codec," 2015 IEEE International Conference on Acoustics, Speech and Signal Processing (ICASSP), Apr. 19, 2015 IEEE, pp. 5723-5727, XP033064796.
J. Lainema et al., "Intra Coding of the HEVC Standard," IEEE Transactions on Circuits and Systems for Video Technology, Dec. 1, 2012 Institute of Electrical and Electronics Engineers, US, vol. 22, No. 12, pp. 1792-1801, XP055559664.
ISO/IEC, Int. Standard 23003-3, "Information technology—MPEG audio technologies—Part 3: Unified speech and audio coding," Geneva, Switzerland, Jan. 2012.
C. Helmrich et al., "Low-Complexity Semi-Parametric Joint-Stereo Audio Transform Coding," in Proc. EURASIP European Signal Process. Conf. (EUSIPCO), Nice, France, pp. 794-798, Sep. 2015.
V. Sze et al., "High Efficiency Video Coding (HEVC)—Algorithms and Architectures", Cham, Switzerland: Springer International Publishing, 2014. (uploaded in 2 parts).
D. E. Knuth, The Art of Computer Programming, vol. 2: "Seminumerical Algorithms", 3rd ed., Addison-Wesley, 1997. (Uploaded in 8 parts).
A. Norkin et al., "HEVC Deblocking Filter," IEEE Transactions on Circuits and Systems for Video Technology, Dec. 1, 2012 Institute of Electrical and Electronics Engineers, US, vol. 22, No. 12, pp. 1746-1754, XP011487156.
C.-M. Fu et al., "Sample Adaptive Offset in the HEVC Standard," IEEE Transactions on Circuits and Systems for Video Technology, Dec. 1, 2012 Institute of Electrical and Electronics Engineers, US, vol. 22, No. 12, pp. 1755-1764, XP011487153.
F. Bossen, "Common test conditions and software reference configurations," JCTVC-L1100 and m28412, Geneva, 2013.
ITU-R, Recommendation BT.500-13, "Methodology for the subjective assessment of the quality of television pictures," Geneva, Switzerland, Jan. 2012.
ITU-T, Recommendation P.910, "Subjective video quality assessment methods for multimedia applications," Geneva, Switzerland, Apr. 2008.
Pearson correlation coefficient, Wikipedia, URL: https://en.wikipedia.org/wiki/Pearson_correlation_coefficient#For_a_sample.

(56) References Cited

OTHER PUBLICATIONS

ISR, dated Jun. 18, 2019 from PCT/EP2019/054312.

* cited by examiner

SPECTRALLY ADAPTIVE NOISE FILLING TOOL (SANFT) FOR PERCEPTUAL TRANSFORM CODING OF STILL AND MOVING IMAGES

CROSS-REFERENCES TO RELATED APPLICATIONS

This application is a continuation of copending International Application No. PCT/EP2019/054312, filed Feb. 21, 2019, which is incorporated herein by reference in its entirety, and additionally claims priority from European Application No. EP 18 158 985.4, filed Feb. 27, 2018, which is incorporated herein by reference in its entirety.

Examples herewith refer to encoders for encoding pictures in data streams, decoders for decoding pictures from data streams, and related methods.

At least some of the examples refer to a spectrally adaptive noise filling tool (SANFT) for perceptual transform coding of still and/or moving images.

BACKGROUND OF THE INVENTION

Video information such as pictures may be digitized into matrix-like data, which may map pixels into entries of the matrices. A value of the entry may be, for example, in one of the spaces such as RGB, YUV, and so on. Each entry may be associated, for example, to a particular spatial position in the image (e.g., a pixel position). Data are therefore provided in the spatial domain. Spatial domains are known for which predicted and/or residual values (e.g., errors in the prediction) are associated to particular spatial position in the image.

Spectral domains and/or frequency domains are known for which the values in the spatial domains are transformed into spectral values. Several types of transforms are known, such as the discrete cosine transform, DCT, the discrete sine transform, DST, and so on. Transformed data (also known as coefficients) may be obtained, and they may be grouped into transforms. A transform may be represented in vectorial or in matrix form or in other schematizations (e.g., other 2-dimensional schematizations). A transform may comprise a plurality of coefficients, each being associated to one or more particular frequencies (e.g., a continuous or DC value, and so on) and/or a linear combination of frequencies.

It is known that encoders may encode video data (e.g., transforms) into bitstreams, and to signal the video data together with parameters. Decoders may perform an inverse process, e.g., by transforming the bitstreams into video information (e.g, electronically displayed). With respect to the encoder, the decoder may perform an inverse transformation, e.g., and inverse DCT, IDCT, an inverse DST, IDST, and so on.

However, the encoder and the decoder do not exactly operate on the same data. In fact, video data at the encoder side are quantized, and cannot deterministically reconstructed at the decoder side. For example, noise (e,g., texture data) may be lost, hence reducing the quality of an image when represented.

In order to cope with this issue, noise generation techniques have been developed in the conventional technology. Some conventional technology techniques are known as parametric techniques, in the sense that they are based on providing parameters associated to the noise lost because of the quantization.

Modern lossy image and video coders achieve very high reconstruction quality even at low bit-rates but tend to denoise or detexturize the input images. Traditionally, two independent parametric approaches, referred to as texture and film grain synthesis, have been applied in the spatial domain as pre and post-processors around the codec to counteract such effects.

Perceptual transform coding of digital still images has evolved considerably over the last two decades. Almost a quarter of a century after the completion of the JPEG image specification T.81 [1], formal objective and subjective evaluation of state-of-the-art still image coding standards was conducted for presentation at the 2016 International Conference on Image Processing (ICIP) [2]. In the visual assessments performed in the course of this evaluation, a main still picture profile extension of the H.265/High Efficiency Video Coding (HEVC) specification [3] was found to outperform, with statistical significance, most of the other coding schemes in visual quality across all tested images and bit-rates, without being exceeded in reconstruction quality by any other scheme [4]. Although the HEVC main still picture profile represents one of the most efficient image (and video) coding approaches currently available, like other solutions it tends to introduce visible artifacts such as blurriness and loss of textural detail into the reconstructed images. The authors noticed that, in particular, picture noise and quasi-random textures are softened by the inherent quantization of the "lossy" transform coder at very low bit-rates.

To alleviate this effect, caused by the coarse quantization (and, thus, highly sparse transform-domain representation resulting therefrom) at such low rates, two independent procedures, carried out at the decoder side during image reconstruction, have been developed recently.

The first method, called texture synthesis, intends to regenerate specific textural structures of foreground or background objects in images of natural scenes. This approach is generally applied in a parametric fashion by transmitting auxiliary information about the textural details and/or location to the decoder for guided synthesis [5]-[13]. It is worth noting that, on the one hand, a very compact representation of the parametric side-information is crucial particularly in low-bit-rate coding, in order not to cancel the subjective benefit of the texture synthesis by notably reducing the bit budget of the underlying transform coder architecture. On the other hand, texture-specific artifacts, such as the abovementioned ones, due to an insufficient parameter rate (see [5], [9]) shall be avoided.

The second method, traditionally called film grain synthesis, is employed to recreate the film (i. e., media) or camera (i. e., sensor) noise introduced into natural images during the picture acquisition process particularly at low light levels, which, as noted earlier, is prone to visual removal by low-rate coding algorithms [14], [15]. The basic principle behind this approach is an additive image plus noise model: the image to be compressed is split into a noise-like and a denoised component, the latter is encoded by a conventional image coding solution, and the former is reconstructed, again in a typically guided parametric manner, by a dedicated synthesis procedure and added to the decoded denoised image [14]-[20]. The noise parameters may comprise information such as higher-order statistics (variance, skewness, or kurtosis) [14], [20] or autoregressive (AR) model data [16]-[19], which may be extracted in either the spatial domain [14]-[19] or a spectral domain [20]. Note that, in the abovementioned work, a single global noise model is used for the entire image (or video frame). Thus, a single image source has to be assumed, and suboptimal visual performance may need to be accepted when coding images compiled from different origins.

FIG. 1 shows a technique 100 according to the conventional technology (e.g., texture synthesis or film grain synthesis). At an encoder side 110, an input 112 is provided. The input is in the spatial domain and may indifferently refer to pixel values, error residuals and other data. At stage 114, the input is denoised and/or texture is removed in the spatial domain, to obtain denoised and/or texture-removed video data 116 (spatial domain). At stage 118, the denoised and/or texture-removed video data 116 are transformed into the spectral domain and encoded into a bitstream (coded denoised image) 120, e.g., using a HEVC technique. A noise component 122 of the input 112 is obtained by subtracting, at stage 121 (spatial domain), texture-removed video data 116 from the input 112. At stage 124, one of the model estimations may be based on statistical data as discussed above (e.g., variance, skewness, kurtosis . . . ). Coded model parameters 126 (spatial domain) may therefore be extracted from the denoised component 122 of the input 112 and signalled to a decoder side 130.

At the decoder side 130, a decoding may be based on a conventional HEVC technique at stage 132 (which also inversely transforms the video data from the spectral domain to the spatial domain), to obtain a noiseless image 134 in the spatial domain. The stage 132 may also output texture templates 136, which are optional noise or texture patterns generated (i.e. derived during stage 132) from the conventionally decoded noiseless image 134 and which may be input to a noise or texture synthesis stage 138 to generate noise or texture 140 on the basis of the coded model parameters 126 obtained from the stage 124. The noise or texture may be added at stage 142 (spatial domain) to obtain the video output 144.

Therefore, in FIG. 1, the issues introduced by the quantization operated within the conventional stage 118 are alleviated by the use of the stages 124 and 138 in combination with the use of stage 114.

The image of the input 112 is explicitly segmented between textural and non-textural spatial areas, which are assessed by stage 124, which processes the noise component 122. Therefore, besides operations at stage 118, operations at stage 124 are to be performed. Further to the transformations needed at stage 118, similar processes are needed for obtaining the model parameters 126, which may involve, for example, analysis of average values, noise color, and so on.

The operations of stage 124 are inevitably prone to classification errors: as the noise is to be classified in a small number of classes, errors may statistically occur, which cause faulty parameters and a faulty noise or texture synthesis.

In general terms, for each image a single, global noise model is used, which is to be accepted for the entire image.

SUMMARY

According to an embodiment, an encoder apparatus for encoding a picture into a data stream is configured to: subject a transform of a block of the picture to quantization to acquire a quantized transform; determine a zero-quantized portion of the quantized transform; define a second block having coefficients of the transform associated to the zero-quantized portion of the quantized transform; determine at least one noise parameter providing noise information on the transform within second block; signal the quantized transform and the at least one noise parameter, wherein the encoder apparatus is configured to: divide the second block into a higher-frequency zero-quantized portion and a lower-frequency zero-quantized portion; and determine a noise colorness parameter or granularity parameter on the basis of a comparison and/or a relationship and/or a quotient based on: a first sum or aggregate value or statistical value or average value associated to the transform within the higher-frequency zero-quantized portion; and a second sum or aggregate value or statistical value or average value associated to the transform within the second block or within a super block comprising the block.

According to another embodiment, a decoder apparatus for decoding a picture from a data stream is configured to: derive a quantized transform from the data stream, a zero-quantized portion of the quantized transform, and at least one noise parameter providing noise information for a transform in the positions of the zero-quantized portion; provide noise synthesis to synthesize noise associated with the quantized transform on the basis of the at least one noise parameter; and reconstruct the picture using the quantized transform and the synthesized noise, wherein the decoder apparatus is configured to: define at least one frequency boundary on the basis of a noise colorness parameter or granularity parameter describing colorness or granularity of noise of the transform in the positions of the zero-quantized portion, the noise colorness parameter or granularity parameter being comprised in the at least one noise parameter; determine, from the zero-quantized portion, a higher-frequency zero-value subportion and a lower-frequency zero-value subportion; and set at zero the noise for the higher-frequency zero-value subportion and/or avoid noise insertion for the higher-frequency zero-value subportion and/or prevent from synthesizing noise for the higher-frequency zero-value subportion.

According to another embodiment, an encoding method may have the steps of: quantizing a transform of a block of a picture to acquire a quantized transform; defining a second block having coefficients of the transform associated to a zero-quantized portion of the quantized transform; acquiring at least one noise parameter providing noise information on the transform within the zero-quantized portion; signal the quantized transform and the at least one noise parameter, wherein the method may have the steps of: dividing the second block into a higher-frequency zero-quantized portion and a lower-frequency zero-quantized portion; and determining the noise colorness parameter or granularity parameter on the basis of a comparison and/or a relationship and/or a quotient based on: a first sum or aggregate value or statistical value or average value associated to the transform within the higher-frequency zero-quantized portion; and a second sum or aggregate value or statistical value or average value associated to the transform within the second block or within a super block comprising the block.

According to another embodiment, a decoding method may have the steps of: acquiring a quantized transform from a data stream, a zero-quantized portion of the quantized transform, and at least one noise parameter providing noise information for the zero-quantized portion; performing noise synthesis associated with the quantized transform on the basis of the at least one noise parameter; and reconstructing a picture using the quantized transform and the synthesized noise, wherein the method further may have the steps of: defining at least one frequency boundary on the basis of a noise colorness parameter or granularity parameter describing colorness or granularity of noise of a transform in the positions of the zero-quantized portion, the noise colorness parameter or granularity parameter being comprised in the at least one noise parameter; determining, from the zero-quantized portion a higher-frequency zero-value subportion and a lower-frequency zero-value subportion; and setting at zero the noise for the higher-frequency zero-value subportion and/or avoid noise insertion for the higher-frequency zero-value subportion and/or prevent from synthesizing noise for the higher-frequency zero-value subportion.

In accordance to examples, an encoder apparatus for encoding a picture into a data stream is configured to:
  subject a transform of a block of the picture to quantization to obtain a quantized transform;
  determine a zero-quantized portion of the quantized transform;
  determine at least one noise parameter providing noise information on the transform within the zero-quantized portion;
  signal the quantized transform and the at least one parameter.

In accordance to examples, the encoder apparatus may be configured to:
  determine a noise energy parameter or noise level parameter, comprised in the at least one noise parameter, associated to the transform within the zero-quantized portion.

In accordance to examples, the encoder apparatus may be configured to:
  determine the noise energy parameter or noise level parameter by performing averaging, aggregating, and/or obtaining measured values and/or estimated values and/or statistical values associated to the transform within the zero-quantized portion.

In accordance to examples, the encoder apparatus may be configured to:
  determine a noise colorness parameter or granularity parameter, comprised in the at least one noise parameter, describing colorness or granularity of noise of the transform at zero-quantization portion.

In accordance to examples, the encoder apparatus may be configured to:
  determine the noise colorness parameter or granularity parameter (g) on the basis of a spectral tilt value or low-pass characteristic associated to the noise of the transform within the zero-quantized portion.

In accordance to examples, the encoder apparatus may be configured to:
  divide the zero-quantized portion into a higher-frequency zero-quantized portion and a lower-frequency zero-quantized portion; and
  determine the noise colorness parameter or granularity parameter on the basis of a comparison and/or a relationship and/or a quotient based on:
    a first sum or aggregate value or statistical value or average value associated to the transform within the higher-frequency zero-quantized portion; and
    a second sum or aggregate value or statistical value or average value associated to the transform within the lower-frequency zero-quantized portion.

In accordance to examples, the encoder apparatus may be configured to:
  determine the noise colorness parameter or granularity parameter between at least:
    a first value associated to Browinan colorness or granularity; and
    a second value associated to white colorness or granularity.

In accordance to examples, the encoder apparatus may be configured to:
  exclude at least the lowest frequency from the zero-quantized portion In accordance to examples, the encoder apparatus may be configured to:
  perform a first determination to determine a noise colorness parameter or granularity parameter describing colorness or granularity of noise of the transform within the zero-quantized portion;
  perform second determinations to determine a noise energy parameter or noise level parameter associated to the transform within the zero-quantized portion,
  wherein each of the second determinations is performed for one block of a group of blocks and the first determination is performed for the entire group of blocks,
  so as to associate an energy parameter or noise level parameter to each block of the plurality of blocks, and
  to associate one noise colorness parameter or granularity parameter to the entire group of blocks.

In accordance to examples, a decoder apparatus for decoding a picture from a data stream is configured to:
  derive a quantized transform from the data stream, a zero-quantized portion of the quantized transform, and at least one noise parameter providing noise information for the zero-quantized portion;
  provide noise synthesis to synthesize noise associated with the quantized transform on the basis of the at least one noise parameter; and
  reconstruct the picture using the quantized transform and the synthesized noise.

In accordance to examples, the decoder apparatus may be configured to:
  derive a quantized transform from the data stream, a zero-quantized portion of the quantized transform, and at least one noise parameter providing noise information for the zero-quantized portion;
  provide noise synthesis to synthesize noise in association with the quantized transform on the basis of the at least one noise parameter; and
  reconstruct the picture using the quantized transform and the synthesized noise.

In accordance to examples, the decoder apparatus may be configured to:
  define a subportion of the zero-quantized portion on the basis of the at least one noise parameter, the at least one noise parameter comprising a noise colorness parameter or granularity parameter describing colorness or granularity of noise of the transform within the zero-quantized portion.

In accordance to examples, the decoder apparatus may be configured to:
  provide the noise synthesis by generating noise for the subportion of the zero-quantized portion.

In accordance to examples, the decoder apparatus may be configured to:
  provide the noise synthesis by inserting pseudo-random values conditioned by a noise energy parameter or noise level parameter comprised in the at least one noise parameter.

In accordance to examples, the decoder apparatus may be configured to:
  define at least one frequency boundary on the basis of a noise colorness parameter or granularity parameter describing colorness or granularity of noise of the transform within the zero-quantized portion, the noise colorness parameter or granularity parameter being comprised in the at least one noise parameter;

determine, from the zero-quantized portion, a higher-frequency zero-value subportion and a lower-frequency zero-value subportion; and set at zero the noise for the higher-frequency zero-value subportion and/or avoid noise insertion for the higher-frequency zero-value subportion and/or prevent from synthesizing noise for the higher-frequency zero-value subportion.

In accordance to examples, the decoder apparatus may be configured to:

synthesize noise on the basis of the at least one noise energy parameter or noise level parameter in such a way that the intensity of the noise inserted into the zero-quantized portion is comparatively increased for a comparatively increased noise energy or noise level of the transform.

In accordance to examples, the decoder apparatus may be configured to:

define at least one frequency boundary on the basis of a noise colorness parameter or granularity parameter describing colorness or granularity of noise of the transform within the zero-quantized portion, the noise colorness parameter or granularity parameter being comprised in the at least one noise parameter;

determine, from the zero-quantized portion, a higher-frequency zero-value subportion and a lower-frequency zero-value subportion; and set at zero the noise for the higher-frequency zero-value subportion and/or avoid noise insertion for the higher-frequency zero-value subportion and/or prevent from synthesizing noise for the higher-frequency zero-value subportion.

In accordance to examples, the decoder apparatus may be configured to:

cut frequencies, in the zero-quantized portion, higher than a frequency threshold defined on the basis of a noise colorness parameter or granularity parameter describing colorness or granularity of noise of the transform within the zero-quantized portion, the noise colorness parameter or granularity parameter being comprised in the at least one noise parameter, so that the frequency threshold is comparatively higher for noise which is whiter than for noise which is less white noise.

In accordance to examples, an encoder apparatus may be configured to:

pseudo-randomly generate a first sequence of pseudo-random values on the basis of a first seed, the first sequence being reset at a first reset frequency;

pseudo-randomly generate a second sequence of pseudo-random values on the basis of a second seed, the second sequence being reset at a second reset frequency greater than the first reset frequency;

combine one of the pseudo-random values of the first sequence with one of the pseudo-random values of the second sequence; and, in some examples, synthesize noise on the basis of the combination.

The apparatus may be configured to:

combine one of the pseudo-random values of the first sequence with one of the pseudo-random values of the second sequence on the basis of at least one noise parameter.

The apparatus may be configured to:

combine one of the pseudo-random values of the first sequence with one of the pseudo-random values of the second sequence on the basis of at least one correlation-related parameter or prediction-related parameter between the current frame and a previous frame.

The apparatus may be configured to:

combine one of the pseudo-random values of the first sequence with one of the pseudo-random values of the second sequence so as to weight the value of the second sequence more than the value of the first sequence in case of comparatively higher correlation and/or higher predictability.

The apparatus may be configured to:

reset the first sequence at each frame, and/or reset the second sequence at each of a plurality of frames.

The apparatus may be configured to synthesize noise on the basis of the combination of one of the pseudo-random values of the first sequence with one of the pseudo-random values of the second sequence.

The apparatus may be configured to operate according to an inter loop to:

insert a reduced quantity of noise to signals;

feeding back the signals to the inter loop; and inserting a remaining quantity of noise to the signals.

In accordance to examples, there is provided a method, comprising:

quantizing a transform to obtain a quantized transform;

defining a zero-quantized portion of the quantized transform;

obtaining at least one noise parameter providing noise information on the transform within the zero-quantized portion;

signal the quantized transform and the at least one parameter.

In accordance to examples, there is provided a method, comprising:

obtaining a quantized transform from a data stream, a zero-quantized portion of the quantized transform, and at least one noise parameter providing noise information for the zero-quantized portion;

performing noise synthesis associated with the quantized transform on the basis of the at least one noise parameter;

reconstructing a picture using the quantized transform and the synthesized noise.

In accordance to examples, there is provided a method for noise generation, comprising:

using a first seed, generating a first sequence of pseudo-random values, the first sequence being refreshed at a first frequency;

using a second seed, generating a second sequence of pseudo-random values, the second sequence being refreshed at a second frequency greater than the first reset frequency;

linearly combining pseudo-random values of the first sequence with pseudo-random values of the second sequence; and, in some cases, synthesizing noise on the basis of random values obtained by the combination.

BRIEF DESCRIPTION OF THE DRAWINGS

Embodiments of the present invention will be detailed subsequently referring to the appended drawings, in which.

DETAILED DESCRIPTION OF THE INVENTION

According to some techniques and/or standards, such as High Efficiency Video Coding (HEVC), a picture may be subdivided into a plurality of stages. For example, a picture may be divided, in the spatial domain, into a plurality of CTUs (Coding Tree Units). The width and height of a CTU may be signalled in parameters. All the CTUs in a video sequence may have the same size, such as: 64×64, 32×32, or 16×16, etc. "64×64 Unit", "32×32 Unit", and similar annotations indicate a coding logical unit which is encoded into a bit stream. "16×16 Block" and similar annotations indicate a portion of video frame buffer.

CTU indicates a logical unit. A CTU may comprise three blocks, luma (Y) and two chroma samples (Cb and Cr), and associated parameters. Each block may be called CTB (Coding Tree Block), A CTB may be split into CBs (Coding Blocks). Each CB may be associated to a particular type of prediction. It is with reference to the CB, that it is decided whether inter-picture or intra-picture prediction is to be performed. Intra-picture strategies are based on use of residuals from the same picture. Inter-picture prediction strategies are based on use of residuals from another picture (e.g., the preceding one, in the case of video data). The chosen prediction may be coded, as a parameter, in the CU (Coding Unit). CB may also be subdivided into a plurality of Prediction Blocks (PBs). Each CB can be split into a plurality of PBs differently according to the temporal and/or spatial predictability. After a prediction, the residual (difference between predicted image and actual image) may be coded using a spectral transform, for example. CB can be differently split into TUs (Transform Unit). Strategies based on HEVC may be used in the examples above and below. Strategies different from HEVC may be used in the examples above and below.

Figure 2:
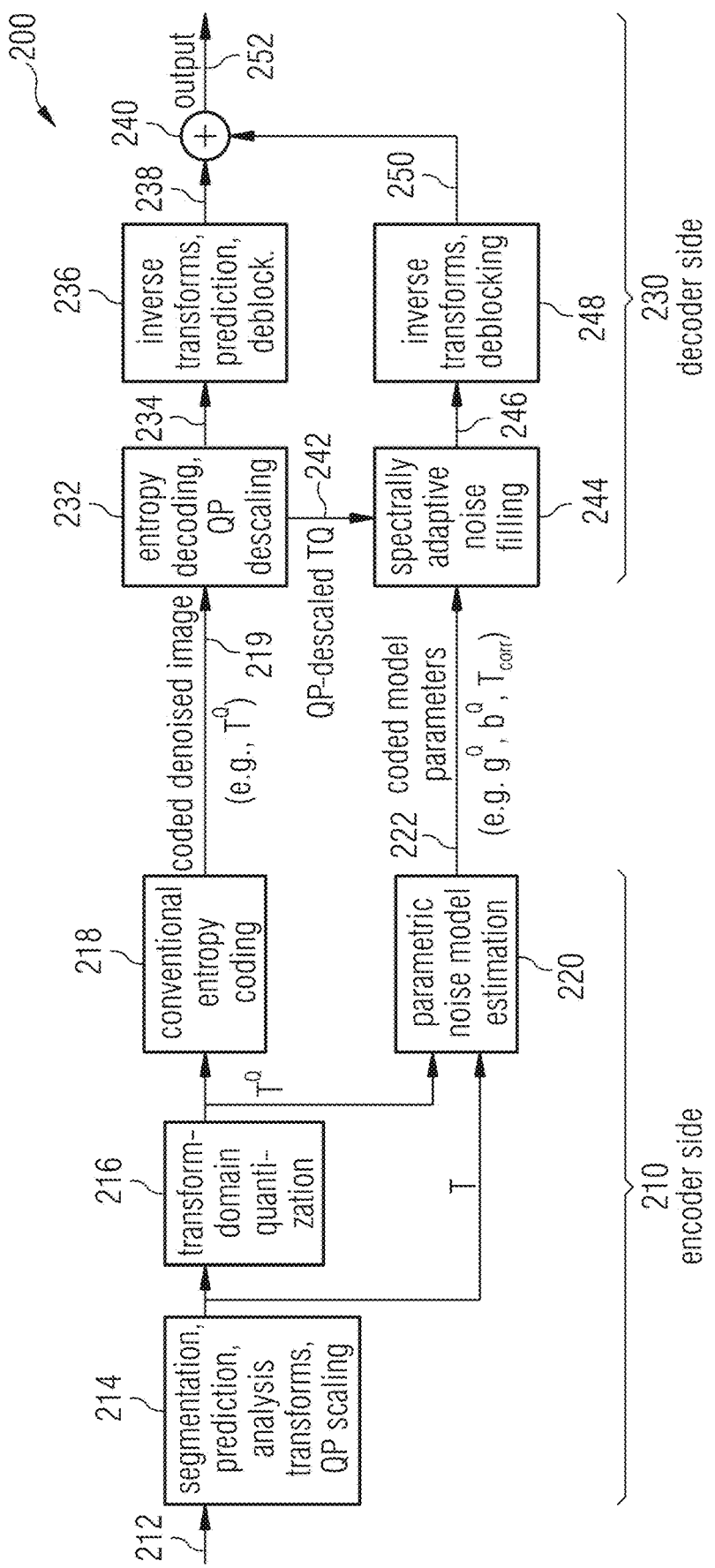
FIG. 2 shows an example of an encoder side and a decoder side.

FIG. 2 shows a system 200. The system 200 may be a system for encoding/decoding picture and/or video data. The system 200 may comprise, for example, an encoder side 210 and a decoder side 230. In examples, the encoder side and the decoder side are the same apparatus. In examples, the encoder side and the decoder side are different apparatus.

At the encoder side 210 (which may be exemplified, in some implementations, by an encoder apparatus), video data 212 (input) may be processed. The video data 212 may be in the spatial domain. The video data may comprise different channels (e.g., luma or chroma channels).

At the encoder side, a stage 214 may be provided. Stage 214 may comprise a segmentation function 214. The segmentation function may define, for an image, a subdivision into CTUs. The segmentation function may define, for a CTU, a subdivision into CBs. The segmentation function may define, for a CB, a subdivision into PBs. Procedures are known for choosing the most appropriate subdivision, so as to obtain a subdivision according to which each stage has the most homogeneous coding noise as possible. Conventional rate-distortion procedures, for example, may be used.

Stage 214 may comprise a prediction function, which may make use of a prediction residual value obtained for an adjacent block (intra-prediction) and/or a previous picture (inter-prediction).

Stage 214 may comprise a quantization parameter (QP) scaling function. The QP may determine the step size for associating the transformed coefficients with a finite set of steps. Large values of QP may represent big steps that approximate the spatial transform, so that most of the signal can be captured by only a few coefficients. Small values of QP refer to more accurate approximations of the block's spatial frequency spectrum, at the cost of more bits.

Figure 3:
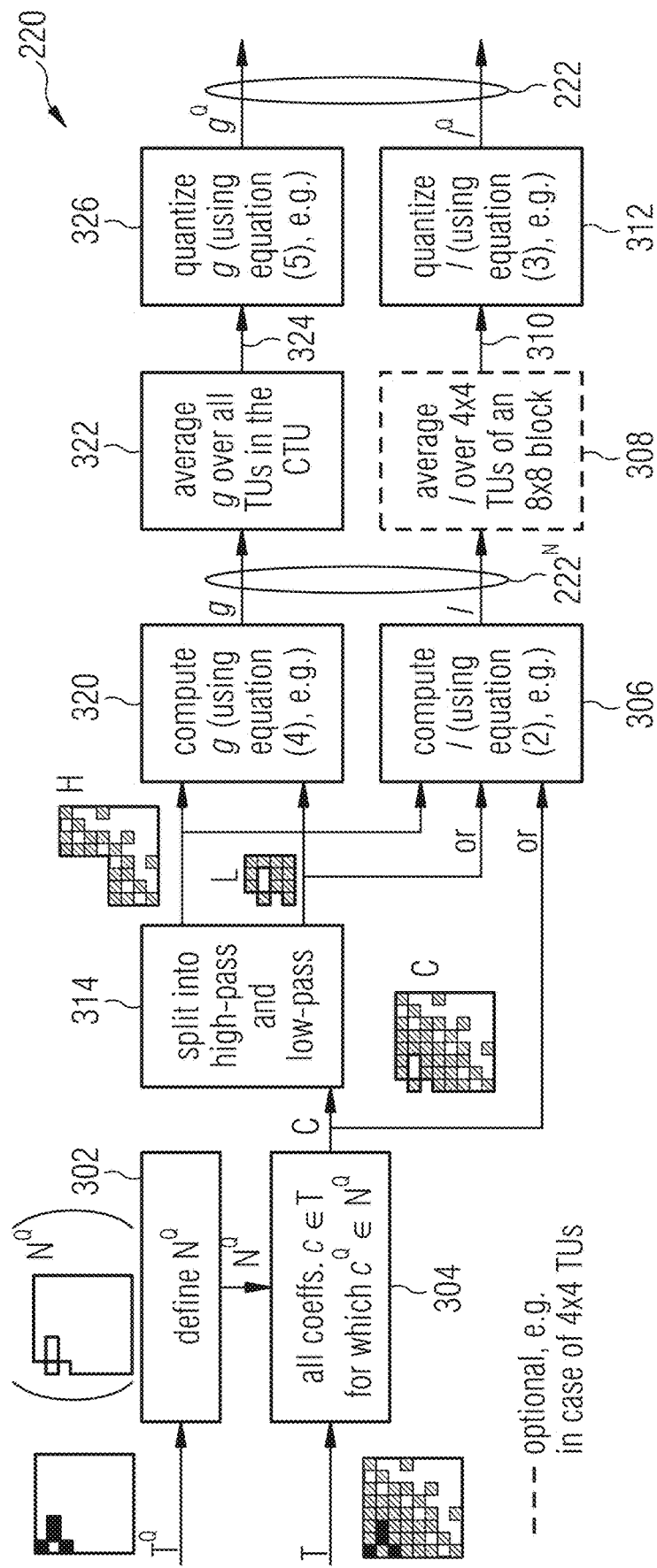
FIG. 3 shows an example of an encoder side.

Stage 214 may comprise an analysis transform function (e.g., DCT, DST, and so on). A transform T may be obtained. The transform T may relate, for example, to spectral values (coefficients) which describe a block (e.g., a prediction block) as a multitude of frequencies. The transform T may be associated to a TU (e.g., in HEVC). FIG. 3 shows an example of transform T. The transform T may be represented, in examples, as a 2-dimensional matrix. Each spectral value may be associated to an entry placed in correspondence to a row and a column of a matrix. In the representation of FIG. 3, the frequencies increase for each row from left to right, and for each column from top to bottom. In examples, each spectral value may be represented, for example, with an intensity (in grey scales) on the paper figure: the higher the intensity, the higher the value (e.g., absolute value). For example, in FIG. 3, T appears as having a lowest harmonic (e.g., DC value, e.g., fundamental), represented as the top-left square of the block representing T, hence having a high value. In the same example, the highest harmonics have very low values (or zero values).

The transform T may be quantized at stage 216 to obtain a quantized transform $T^Q$. The quantized transform $T^Q$ may be understood as a version of T for which coefficient values, intermediate between a higher value and 0, are forced to be zero. The quantized transform $T^Q$ may be understood to only comprise ones or zeroes in the entries of the matrix. FIG. 3 shows an example of quantized transform $T^Q$. The quantized transform $T^Q$ may be represented, in examples, as a 2-dimensional matrix. Each of the value quantized transform $T^Q$ may be associated to an entry placed in correspondence to a row and a column of a matrix. By comparing the quantized transform $T^Q$ with the transform T, it may be easily noted that fine spectral detail, i.e. noise or texture has been deleted because of the quantization.

At stage 218, entropy coding or another operation may be performed. A bitstream 219 (carrying information regarding the coded denoised image) may therefore be signalled to the decoder side 230. For example, the bitstream 219 may be transmitted (e.g., using an antenna and radio-frequency communications) and/or stored into a storage means (e.g., a random access memory, RAM, a hard disk, a flash memory, or another mass memory).

At stage 220, a parametric noise model estimation is performed in the spectral domain. Stage 220 may use both the transform T and the quantized transform $T^Q$. Stage 220 may signal at least one noise parameter 222 (coded model parameters) to the decoder side 230. For example, the at least one noise parameter 222 may be transmitted (e.g., using an antenna and radio-frequency communications) and/or stored into a storage means (e.g., a random access memory, RAM, a hard disk, a flash memory, or another mass memory).

In examples, the at least one noise parameter may comprise, inter alia, a noise energy parameter, a noise level parameter, a noise colorness parameter, a noise granularity parameter, a temporal correlation, etc. In inter-loop related examples, a correlation parameter between a previous signal and a current signal may also be obtained.

At the decoder side 230, a stage 232 may perform entropy decoding and/or QP descaling to obtain an entropy-decoded and/or QP-descaled value 234. Notably, the value 234 is in the spectral domain.

At stage 236, an inverse transformation is performed. For example, an IDCT or an IDST may be performed, to obtain a noiseless image data 238. The noiseless image data 238 may be combined with the noise composer stage 240 with noise 250 to provide a video output 252.

In order to generate the noise 250, the at least one parameter 222 may be used. At stage 244, spectrally adaptive noise filling may be performed, e.g., by using, in case, values 242 (e.g., QP descaled version of $T^Q$). The obtained noise 246 is in the spectral domain.

At stage 248, the noise 246 in the spectral domain may be inversely transformed to obtain the noise 250 in the spatial domain to be used for the video output 252.

Hence, the parametric noise model estimation is performed, at 220, on the basis of data in the spectral domain, such as the transform T and the quantized transform $T^Q$. This is different from the parametric model estimation 124 of the conventional technology, which is in the spatial domain. It has been noted that it is much easier to estimate noise on the basis of spectral data with respect to classify noise from spatial data. No operation is to be repeated as in case of stages 118 and 124 of the conventional technology.

Therefore, FIG. 2 refers to an encoder (encoder side) 210 for encoding a picture into a data stream 219, configured to:
  subject a transform T of a block of the picture to quantization to obtain a quantized transform $T^Q$;
  determine a zero-quantized portion $N^Q$ of the quantized transform $T^Q$;
  determine at least one noise parameter (e.g., I, $I^Q$, g, $g^Q$, TCorr) providing noise information on the transform T within the zero-quantized portion $N^Q$;
  signal the quantized transform $T^Q$ and the at least one parameter.

Therefore, FIG. 2 refers to a decoder (decoder side) 230 for decoding a picture from a data stream 219, configured to:
  derive a quantized transform)($T^Q$) from the data stream, a zero-quantized portion) ($N^Q$) of the quantized transform)($T^Q$), and at least one noise parameter (noise energy or level I or $I^Q$/noise colorness or granularity g or $g^Q$) providing noise information for the zero-quantized portion)($N^Q$);
  provide noise synthesis to synthesize noise associated with the quantized transform ($T^Q$) on the basis of the at least one noise parameter (noise energy or level I or $I^Q$/noise colorness or granularity g or $g^Q$); and
  reconstruct the picture using the quantized transform and the synthesized noise.

FIG. 3 shows an example of stage 220 of parametric noise estimation. Stage 220 may be a method in examples, each stage representing one method step. Stage 220 may be an apparatus in examples, each stage being a particular unit (e.g., a combination of hardware and programming).

Stage 220 may be input by the transform T and/or the quantized transform $T^Q$ (see also above).

Stage 220 may comprise a stage 302 of determining (defining) a zero-quantized portion $N^Q$ of the quantized transform $T^Q$. The zero-quantized portion $N^Q$ may be formed by coefficients of $T^Q$ which are zero. The zero-quantized portion $N^Q$ may give information on the positions of coefficients equal to zero within $T_Q$. The position may be represented with rows and columns in the matrix and/or may be understood as being associated to frequencies at which the coefficients are zero. In examples, the zero-quantized portion $N^Q$ does not distinguish between the coefficients which were actually zero in $T^Q$ and those which have been actually truncated by effect of the quantization. Also the coefficients which were originally zero are part of the zero-quantized portion N° as they have been notwithstanding quantized to zero. A representation of $N^Q$ is shown in FIG. 3. It may be seen that $N^Q$ appears as being shaped as a complementary of the non-zero values of $T^Q$. For example, if the DC spectral value of $T^Q$ is nonzero, $N^Q$ fails to have the DC spectral value. $N^Q$ may be construed so that its dimensions are not greater than the dimensions of $T^Q$.

Figure 1:
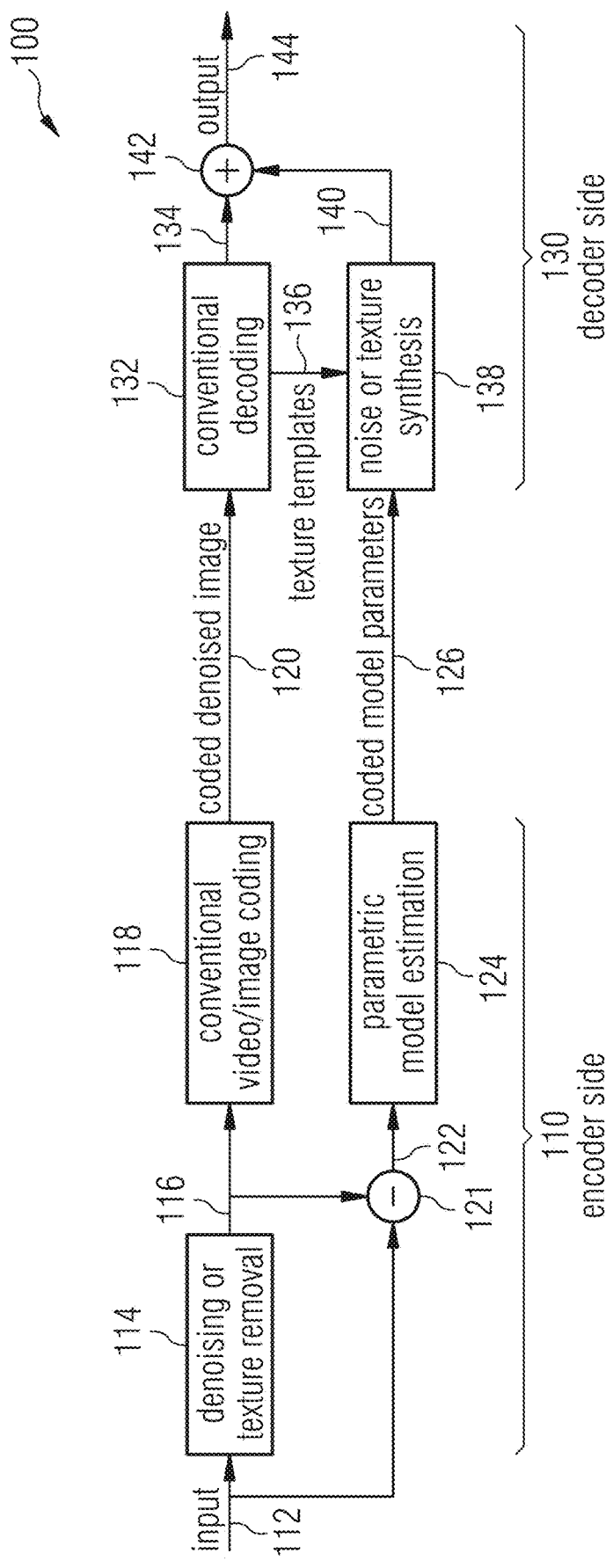
FIG. 1 shows an example according to the conventional technology.

$N^Q$ may be understood as indicating the frequencies of $T^Q$ which would be discarded by the conventional stage 118 of FIG. 1.

Stage 220 may comprise a stage 304 of retrieving coefficients of the transform T which are associated to the frequencies of $N^Q$ as determined at stage 302. We may, for example, define a block C (e.g., representable as a matrix) which is only defined in the positions of $N^Q$ but, instead of having zeroes as values, has the values of T at the corresponding entries. By complementing $T^Q$ with C, the original transform T may be obtained. Block C may be understood as being associated to the noise that has been polished from the quantized transform $T^Q$ by effect of the quantization. Other techniques may be obtained.

Stage 220 may comprise a stage 306 at which at least part of noise information $222^N$ is derived (e.g., computed). For example, a noise energy parameter or a noise level parameter may be obtained. It has been noted, in fact, that block C is particularly adapted to obtain noise information (here indicated as I) associated to the transform T. In examples, an aggregate value or statistical value or average value associated to the coefficients of C may be performed. In examples, the absolute value of the coefficients may be calculated. We may calculate, for example:

$I$=mean(abs(all coeffs. $c \in T$ for which $c^Q \in N^Q$)), which is the same of $I$=mean(abs(all coeffs. $c \in C$).

In examples, at stage 308 averages and/or aggregations and/or other statistical operations between different transforms (e.g., associated to different and/or adjacent blocks) may be performed. For example, the noise energy parameter or a noise level parameter may be averaged. The obtained noise information 308 of a block may therefore keep into account the noise information of adjacent blocks. For example, in HEVC the noise energy parameter or a noise level parameter may be averaged over 4×4 TUs of an 8×8 block. In case, an averaged noise information 310 may be obtained.

At stage 312, the noise information I (in case, after having been averaged at 308) may be quantized, to obtain at least a part of the at least one noise parameter 222 to be signalled to the encoder. The quantized noise information (quantized noise energy parameter or quantized noise level parameter) $I^Q$ may, in particular, be encoded in a field of a bitstream (e.g., with fixed length, e.g., of some bits). Notably, also the quantized noise information is noise information.

In examples, the quantized noise information may be represented as $I^Q$=0 if $I$<1/16, $I^Q=\lfloor 9+2 \log_2(I) \rfloor$ otherwise where "$\lfloor$" is the floor function and gives the integer part of the argument. Note that, instead of the floor function, a rounding function may be used.

In examples, the higher the noise of T, the higher the noise energy parameter or noise level parameter, and the higher the quantized noise energy parameter or quantized noise level parameter.

The encoder side 230 will make use of the noise energy parameter or noise level parameter for noise synthesis.

Notably, the noise energy parameter or noise level parameter may be obtained in the spectral domain, without necessity of deriving the noise component 122 in the spatial domain as in FIG. 1 and without the necessity of ding out the noise components from data in the spatial domain.

In addition or alternative, noise colorness parameter or granularity parameter may be obtained. It has been noted, in fact, that block C is particularly adapted to obtain noise information (here indicated as g) associated to the transform T.

At stage 314, for example, it is possible to divide (split) the zero-quantized portion $N^Q$ into a higher-frequency zero-quantized portion and a lower-frequency zero-quantized portion. This operation is the same of dividing C into a higher-frequency portion H and a lower-frequency portion L. This is because C is defined in the same frequencies of $N^Q$ (but C has not necessarily zero coefficients, which are instead the only coefficients of $N^Q$). In examples, a threshold (s) may be defined for separating the higher-frequency portion H from the lower-frequency portion L. In examples, the threshold(s) is(are) predefined.

At stage 320, noise colorness parameter or granularity parameter g may be obtained on the basis of the higher-frequency zero-quantized portion and a lower-frequency zero-quantized portion of $N^Q$ (e.g., on the basis of H and L). The noise colorness parameter or granularity parameter g may be obtained on the basis of a spectral tilt value or low-pass characteristic associated to the noise of the transform T within the zero-quantized portion $N^Q$.

The division of C into H and L may be appropriated. It is possible to determine the noise colorness parameter or granularity parameter g on the basis of a comparison and/or a relationship and/or a quotient based on:
  a first sum or aggregate value or statistical value or average value associated to the transform (T) within the higher-frequency zero-quantized portion)($N^Q$) (e.g., associated to L); and
  a second sum or aggregate value or statistical value or average value associated to the transform (T) within the lower-frequency zero-quantized portion)($N^Q$) (e.g., associated to H).

In examples, a quotient or another relationship may be based, for example, on a numerator formed by values of H which are summed or averaged or aggregated with each other (e.g., in absolute values) and divided by a denominator formed by values of L after having summed or averaged or aggregated with each other (e.g., in absolute values).

For example, it is possible to perform:
  a first determination to determine a noise colorness parameter or granularity parameter g describing colorness or granularity of noise of the transform T within the zero-quantized portion $N^Q$;
  second determinations to determine a noise energy parameter or noise level parameter I associated to the transform T within the zero-quantized portion ($N^Q$).

Each of the second determinations is performed for one block of a group of blocks and the first determination is performed for the entire group of blocks, so as to associate an energy parameter or noise level parameter (I) to each block of the plurality of blocks, and to associate one noise colorness parameter or granularity parameter (g) to the entire group of blocks. An example may be provided, for example, by:

$$g = \frac{\text{mean(abs(all high-frequency coeffs. } c \in T \text{ with } c^Q \in N^Q))}{1 \text{ mean(abs(all low-frequency coeffs. } c \in T \text{ with } c^Q \in N^Q))}$$

Note that a different factor other than 1, like 2 or 0.5, can also be used to perceptually optimize the mapping of the values L and H to g.

In examples, the coefficient associated to the lowest frequency (e.g., the DC frequency) may be excluded.

In examples, it is possible to determine the noise colorness parameter or granularity parameter g on the basis of a spectral tilt value or low-pass characteristic associated to the noise of the transform T within the zero-quantized portion $N^Q$.

It has been noted, unexpectedly, that it is not necessary to strictly limit the low-frequency values to the coefficients of the specific block. It is also possible to use the low-frequency values averaged or aggregated or statistically processed from an entire super block that contains the block to which the transform T refers. For example, it is possible to use one single mean or average or aggregate value or summation or statistical value associated to an entire CTU. It is possible, for example, to use:

$$g = \frac{\text{mean(abs(all high-frequency coeffs. in the block))}}{1 \text{ mean(abs(all low-frequency coeffs. in the } CTU))}$$

Accordingly, computational efforts are reduced and the operations are sped up.

It has been noted, for example, that the blocks of one single CTU have in general similar noise characteristics, also owing to the segmentation procedure (e.g., performed at stage 214), which has already defined a single CTU as being formed by elements with similar noise characteristics. Therefore, there is no need, for each block, to recalculate values such as mean(abs(all low-frequency coeff. c∈T with $c^Q \in N^Q$), but it is possible to simply process it for one single CTU and using it for determining each quotient.

The noise colorness parameter or granularity parameter g may be comprised between:
  a first value associated to Browinan colorness or granularity; and
  a second value associated to white colorness or granularity.

The value g obtained at 320 may be one noise parameter $222^N$ to be signalled to the encoder. At 322, the noise colorness parameter or granularity parameter g may be averaged over all the blocks (e.g., TUs) in the CTU to obtain an averaged noise colorness parameter or granularity parameter.

At 326, the value g (in case, after having being averaged) may be quantized, to obtain a quantized noise colorness parameter or quantized granularity parameter $g^Q$.

In examples, the quantized noise colorness parameter or quantized granularity parameter $g^Q$ may be defined so as to be:

$$g^Q=4 \text{ if } g \leq 0, g^Q=\lfloor 4-4\sqrt{\min(1,g)} \rfloor \text{ otherwise.}$$

The quantized noise information (quantized noise colorness parameter or quantized granularity parameter) $g^Q$ may, in particular, be encoded in a field of a bitstream (e.g., with fixed length, e.g., of some bits). Notably, also the quantized noise colorness parameter or quantized granularity parameter is noise information.

The decoder will therefore be capable of distinguishing the particular type of the noise, e.g., on the basis of $g^Q$ and/or $I^Q$.

It is noted that blocks 320-326 operate on the transform domain hence avoiding the necessity of stages 121 and 124 in the spatial domain.

Further, the noise information (g, I, $g^Q$, $I^Q$ etc.) is at least partially obtained with reference to a single portion of a picture (e.g., a TU, and/or a CTU in some cases), so as to provide particularly localized information regarding the noise (texture). Therefore, a particularly adapted noise information may be provided to the decoder.

It is also possible to obtain a fine scalability for between an entirely parametric estimation and transparent estimation: a user simply has to regulate the quantization at stage 216 according to known techniques. A user may, for example, modify the quantization stage so as to increase the number of zero-quantized coefficients (i.e., increasing the entries of $N^Q$) or reducing the number of zero-quantized coefficients (so that, for example, $T^Q$ in FIG. 2 appears to have less values different to zero). Accordingly, also reliability is increased and classification errors may be tolerated by simply modifying the quantization parameters.

Hence, the encoder may be configured to:
subject (216) a transform (T) of a block of the picture to quantization to obtain a quantized transform)($T^Q$;
determine (302) a zero-quantized portion ($N^Q$) of the quantized transform ($T^Q$);
determine (304) at least one noise parameter (222, I, $I^Q$, g, $g^Q$, TCorr) providing noise information on the transform (T) within the zero-quantized portion ($N^Q$);
signal the quantized transform ($T^Q$) and the at least one parameter.

Figure 4:
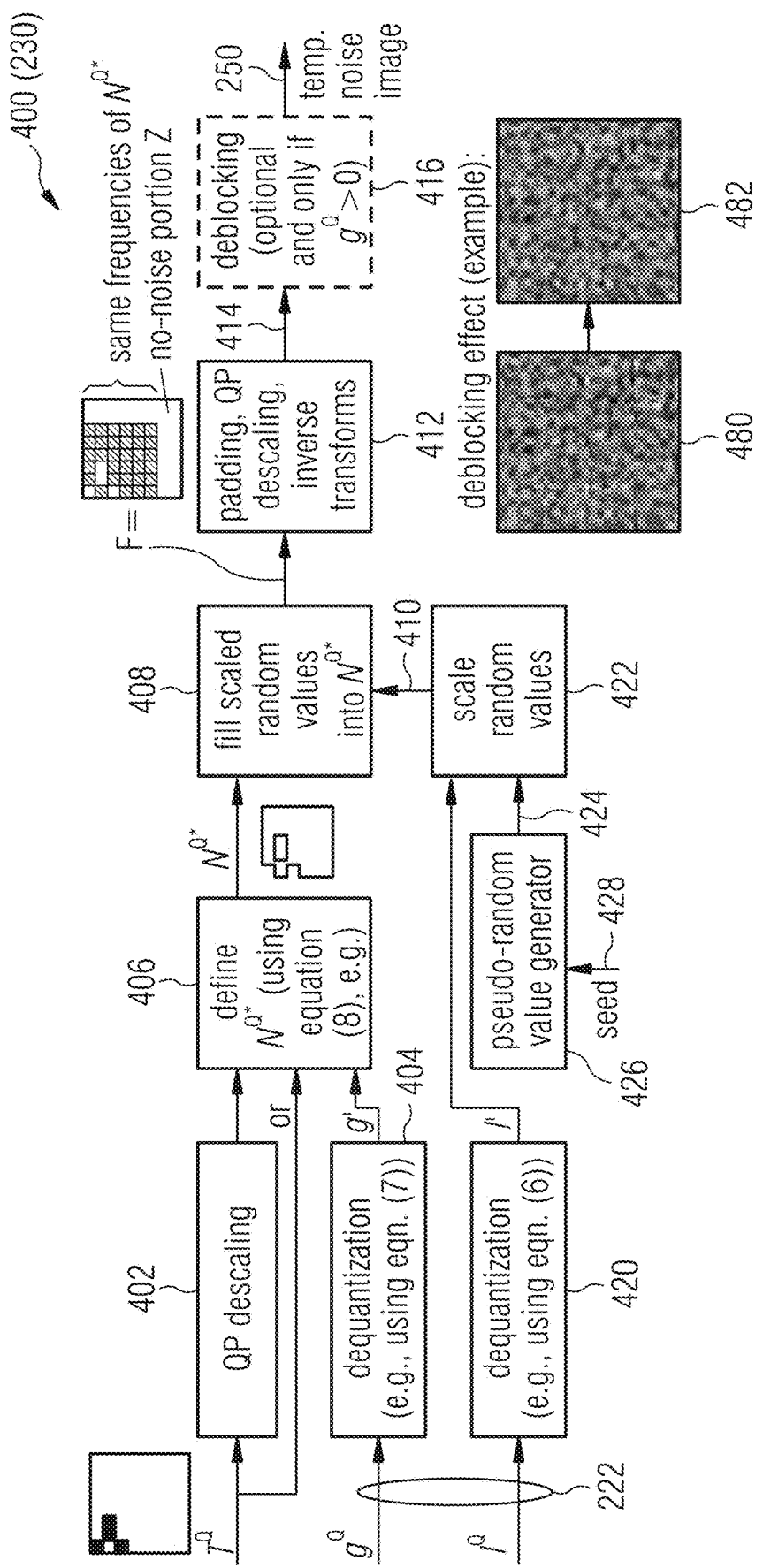
FIG. 4 shows an example of a decoder side.

FIG. 4 shows a decoder side 400 which may be used to implement, at least partially, the decoder side 230 and/or to decode a bitstream, e.g., obtained (signalled and/or transmitted and/or stored on a support, etc.) from an encoder side, such as the encoder side 210. For example, the decoder side 400 may be input with noise information 222 such as noise energy or level I or $I^Q$ and/or noise colorness or granularity g or $g^Q$. In examples, other parameters may be provided to the decoder side 400. In examples, different parameters (associated to the noise of the transform T) may be provided to the decoder side 400. The decoder side 400 may also be provided with the quantized transform $T^Q$. The decoder side 400 may be understood as a method, each stage referring to a step, and/or to a unit, each stage referring to a combination of hardware and programming to perform a particular function useful to decode the data associated to the transform T.

In examples, an optional stage 402 for QP descaling may be provided. In some examples, stage 402 implements, at least partially, stage 232 of FIG. 2.

In examples, the decoder side 400 may comprise a dequantization stage 404. The dequantization stage 404 may use the noise colorness parameter or granularity parameter (e.g., its quantized version go) from the bitstream. The noise colorness parameter or granularity parameter may be, for example, read from a particular data filed of the bitstream, e.g., one having a particular (e.g., predefined) position and/or a particular (e.g., predefined) length. In examples, the noise colorness parameter or granularity parameter may therefore be derived so as to distinguish, for example, between Brownian noise, white noise, and a plurality of intermediate colors or granularities.

In examples, it is possible to perform:
$$g'=2^{-g^Q/4},$$

In examples, a white noise may have g'=1, and Brownian noise may have g'=0.5.

The decoder side 400 may comprise a stage 406. This stage 406 may make use of the zero-quantized portion $N^Q$ of the quantized transform $T^Q$. $N^Q$ is in general easily determined from $T^Q$, as $N^Q$ is simply formed from the portions of $T^Q$ with coefficients equal to zero.

From $N^Q$, a subportion $N^{Q*}$ is defined. The subportion $N^{Q*}$ may be defined so as to be a low-pass version of $N^Q$. For example, coefficients at frequencies greater than threshold may be cut. When representing $N^Q$ as a matrix, the subportion $N^{Q*}$ may be understood as a matrix defined in the same entries of $N^Q$, apart from the last rows and/or columns (corresponding to the higher frequencies), which are cancelled. Of course, a major information carried by $N^{Q*}$ is the frequencies at which the $N^Q$ is cut.

The subportion $N^{Q*}$ is defined on the basis of the noise colorness parameter or granularity parameter g. In examples, the whiter the noise (texture) of the transform T, the bigger $N^{Q*}$ with respect to $N^Q$. In examples, the more Brownian the noise (texture) of the transform T, the smaller $N^{Q*}$ with respect to $N^Q$. The better the noise is distributed, the more $N^{Q*}$ corresponds to $N^Q$. $N^Q$ is therefore a low-pass version of $N^Q$. The cutoff frequency (boundary) may therefore be understood as being dynamically defined. For example, the higher the colorness or granularity, the higher the cutoff frequency, the bigger N.

Given the vertical and horizontal dimensions of the block (e.g., TU) as a height h and width w, respectively, the spectral region of T to be noise filled (i. e., reconstructed parametrically) may be determined, according to examples, as:

$$N^{Q*}=\text{all coeffs. } c^Q \in N^Q \text{ at indices } h' < \lceil h \ g' \rceil, w' < \lceil w \ g' \rceil$$

where "⌈⌉" is the ceiling function and "[ . . . ]" is the rounding function. Note that, for g'<1, $N^{Q*}$ represents a low-pass subset of all zero-valued coefficients in $T^Q$.

In examples, the decoder side 400 may comprise a stage 408 for filling random values 410 on $T^Q$. In examples, the random values 410 may be obtained considering the value I'. In examples, random noise, however, is not filled on the whole $T^Q$, but only on the subportion $N^{Q*}$. Stage 408, therefore, may produce a block F in which noise is filled only in correspondence to $N^{Q*}$. A no-noise portion Z may be formed by the subportion of $N^Q$ not interested by $N^Q$. The no-noise portion Z may be formed, for example, by coefficients which are zero. In examples, when the noise is white noise, the no-noise portion Z may be void. In examples, the no-noise portion Z is maximum where the noise is Brownian noise.

At stage 412, padding, QP descaling and/or inverse transformations may be performed to obtain noise 414 in the spatial domain.

At stage 416, an optional deblocking procedure may be performed. In examples, a spatial two-tap smoothing filter may be applied, e.g., where the noise is not white. The deblocking effect may be understood by comparing the non-deblocked element 480 (before stage 416) with the blocked element 482 (after stage 416).

As may be noted, the noise synthesis may be operated at the spectral domain. There is no necessity for the stage 138 in the spatial domain as in FIG. 1.

Notably, the dimension of the subportion $N^{Q*}$ may be directly derived from the noise colorness parameter or granularity parameter, which in turn is conditioned by the quantization as performed at stage 216. Therefore, by modifying the parameter for the quantization at the encoder side, we will obtain a fine scalability for the dimensions of $N^{Q*}$ and for the noise synthesis.

It is also to be noted that the noise colorness parameter or granularity parameter are in general different for each block, which permits to increase the quality of the generated noise.

In examples, the random values 410 may be obtained on the basis of the at least one noise parameter 222. In examples, the random values 410 may be obtained on the basis of the noise color or energy I (or its quantized version $I^Q$).

At stage 420, a noise energy parameter or noise level parameter may be obtained. The noise energy parameter or noise level parameter may be, for example, read from a particular data filed of the bitstream, e.g., one having a particular (e.g., predefined) position and/or a particular (e.g., predefined) length. In examples, the noise colorness parameter or granularity parameter $I^Q$ may be processed to obtain a reconstructed value I'.

In examples, I may be reconstructed to $0 \leq I' \leq 0.5$ using the decoded level index, $I'=0$ if $I^Q=0$, $I'=2(I^Q-9)/2$ otherwise.

In examples, I' may be used to scale random values at a random scaler stage 422. The random scaler stage 422 may obtain random values 424 from a pseudo-random value generator stage 426. Accordingly, it is possible to use random values 422, for the noise synthesis, which consider the noise energy or level. The pseudo-random value generator stage 426 may base its random generation on a seed 428.

In general terms, the higher the noise energy parameter or the noise level parameter, the higher the random values 410, the higher the noise generated into $T^Q$. Notably, however, where the dimensions of $N^{Q'}$ are reduced with respect to $N^Q$ (non-white noise of T), the random coefficients, irrespective of their intensity, are not inserted into all the frequencies: by virtue of having a non-void no-noise portion Z, we obtain a noise generation only on the frequencies which in $N^{Q*}$. Accordingly, we have obtained a low-pass filter for the noise.

Notably, for each block (e.g., TU) of the picture we obtain a different intensity of the noise, which will be distributed, however, only at some particular frequencies: this permits to increase quality for the texture of the images, which may appear differently in accordance to different regions of the image (e.g., blocks, TUs) and of different colorness, energy, etc.

According to examples, the resulting picture may, therefore, appear with;
  many different portions (blocks), which are in general different from each other (e.g., on the basis of different energy parameter, noise level parameter, noise colorness parameter, granularity parameter, as obtained from the detection in the spectral domain); and/or
  different portions with different sizes, each size being characterized by subportion (blocks, TUs) of homogenous texture; and/or
  for each portion, a synthesized noise which may:
    have high intensity or low intensity based on parameters such as energy parameter, noise level parameter, etc.; and/or
    be low-pass filtered or high-pass filtered based on parameters such as noise colorness parameter, granularity parameter, etc.

Accordingly, noise is synthesized on the basis of the at east one noise energy parameter or noise level parameter (I', $I^Q$) in such a way that the intensity of the noise inserted into the zero-quantized portion $N^Q$ is comparatively increased for a comparatively increased noise energy or noise level of the transform T.

Hence, the decoder 400 may be configured to:
  define at least one frequency boundary on the basis of a noise colorness parameter or granularity parameter (g', $g^Q$) describing colorness or granularity of noise of the transform T within the zero-quantized portion $N^Q$, the noise colorness parameter or granularity parameter (g', $g^Q$) being comprised in the at least one noise parameter 222;
  determine (406), from the zero-quantized portion $N^Q$, a higher-frequency zero-value subportion and a lower-frequency zero-value subportion $N^{Q*}$; and
  set at zero the noise for the higher-frequency zero-value subportion and/or avoid noise insertion for the higher-frequency zero-value portion and/or prevent form synthesizing noise for the higher-frequency zero-value subportion.

In addition or alternative, the decoder 400 may be configured to:
  cut frequencies, in the zero-quantized portion $N^Q$, higher than a frequency threshold defined on the basis of a noise colorness parameter or granularity parameter (g', $g^Q$) describing colorness or granularity of noise of the transform (T) within the zero-quantized portion No, the noise colorness parameter or granularity parameter (g',$g^Q$) being comprised in the at least one noise parameter,
  so that the frequency threshold is comparatively higher for noise which is whiter than for noise which is less white noise.

In examples, the encoder side and the decoder side may be the same device. In examples, an encoder may comprise an decoder for understanding the signals that the decoder will generate.

Figure 5:
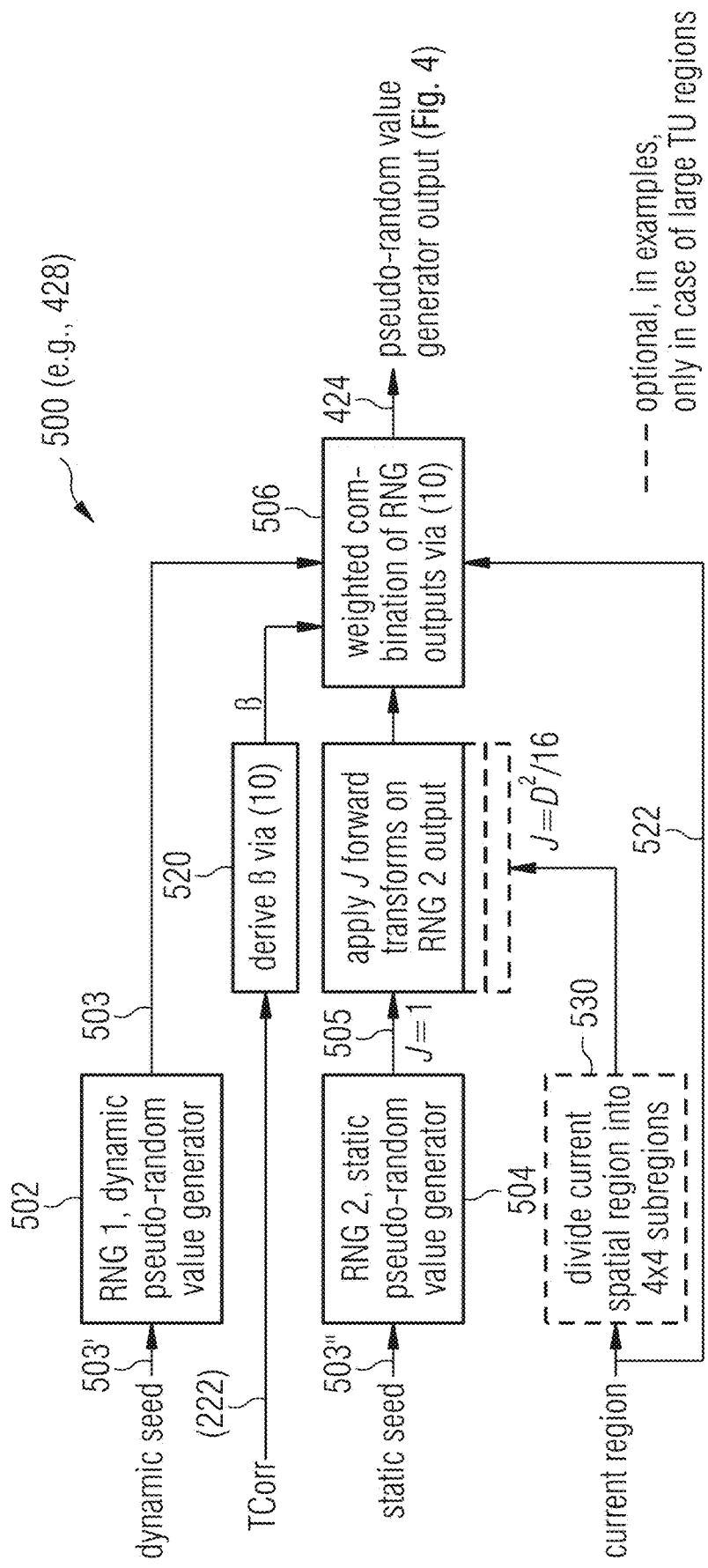
FIG. 5 shows an example of a generator of random values.

FIG. 5 shows an example 500 of a pseudo-random generator. The pseudo-random generator may be the pseudo-random generator 426 of FIG. 4, but in some examples may be completely independent and may be used for completely different decoding applications (even those which are not based on the use of parametric noise estimation in the spectral domain, even though the generator 500 operates appropriately with the rest of the elements of the decoder side 400).

It has been noted that (in particular when operating in inter loop) noise may be appropriately be synthesized when the random generation stages are somehow associated (e.g., in respect of the reset frequencies) to the prediction or correlation or expectation of the values for a current signal (e.g., associated a frame, a block . . . ) on the basis of the previous signal.

A parameter such as a temporal correlation (TCorr) may therefore be obtained (e.g., from the encoder side 210 as part of the at least one noise parameter 222). An example of technique for obtaining TCorr may be, for example, to obtain a Pearson correlation coefficient (see, for example, https://en.wikipedia.org/wiki/
Pearson_correlation_coefficient#For_a_sample). Examples are provided below.

The correlation function gives an idea of a relationship between random functions. A high temporal correlation value indicates a high probability that a signal or a parameter for a previous frame is repeated in the subsequent parameter. While in quasi-still video content temporal correlation tends to be comparatively high, in moving video content temporal correlation tends to be low.

It has been understood that it is possible to:
pseudo-randomly generate (502) (e.g., using a dynamic pseudo-random value generator) a first sequence of pseudo-random values (503) on the basis of a first seed 503', the first sequence being reset at a first reset frequency;
pseudo-randomly generate (504) (e.g., using a static pseudo-random value generator) a second sequence of pseudo-random values 505 on the basis of a second seed, the second sequence being reset at a second reset frequency greater than the first frequency;
combine (506) one of the pseudo-random values 503 of the first sequence with one of the pseudo-random values 505 of the second sequence.

The first sequence of pseudo-random values 503 is reset (refreshed) faster than the second sequence of pseudo-random values 505. For example, the second sequence of pseudo-random values 505 may be reset for every frame, while the first sequence of pseudo-random values 503 may be refreshed every 16 or less than 16 frames, for example.

Accordingly, the first sequence of pseudo-random values 503 will reproduce random values which are tendentially less repetitive than those produced by the second sequence of pseudo-random values 505.

It has been noted, unexpectedly, that by combining (e.g., linearly combining) random values generated by the first generator 502 with random values generated by the second generator 504, and by weighting the combination on the basis of a statistical value associated to the probability of repetition of a signal or a parameter, it is possible to obtain values which are extremely appropriated for noise synthesis. For example, fully identical pseudo-random texture patterns in successive pictures may be obtained in case of highest temporal correlation.

The following cases may be identified:
The correlation between a signal at the previous frame and the signal at the current frame is maximum: we simply need to use, for noise generation, a (static) pseudo-random sequence, which may be based, for example, by only values of the second sequence 505. If, for example, the random generation is reset at each frame, it will be advantageous to have a close value (or the same value) at the subsequent frame for the same signal.
The correlation between a signal at the previous frame and the signal at the current frame is minimum: we simply need to use, for noise generation, a (dynamic) pseudo-random sequence, which may be based, for example, by only values of the first sequence 503. If, for example, the random generation is not reset at each frame, it will be advantageous to have a different value at the subsequent frame for the same signal.
The correlation between a signal at the previous frame and the signal at the current frame is intermediate: we may use, for noise generation, a combination of a (static) pseudo-random sequence and of a (dynamic) pseudo-random sequence, which may be based, for example, by linearly combining values of the second sequence 505 with values of the first sequence 503.

Therefore, it has been understood that, by simply providing to the decoder side a parameter such as the temporal correlation, the noise generation may be intelligently obtained by combining (506) one of the pseudo-random values (503) by combining (506) one of the pseudo-random values (503) of the first sequence with one of the pseudo-random values (505) of the second sequence so as to weight the value (505) of the second sequence more than the value (503) of the first sequence in case of comparatively higher correlation and/or lower predictability.

In examples, the at least one noise parameter 222 comprises the temporal correlation TCorr (e.g., for inter loop), e.g., as provided by the encoder side. TCorr may be quantized as a natural number (e.g., between 0 and 5) which may be encoded in a particular (e.g., predefined) field of the bitstream (and, in case, with a particular, e.g., predefined, length).

At stage 520, a valuer may be obtained on the basis of the temporal correlation TCorr (other techniques may be used). In examples, $$\beta = TCorr/5$$

Therefore, in examples $$\beta \; 0, 0.2, 0.4, 0.6, 0.8, 1$$

In examples, the higher β, the higher the temporal correlation. At stage 506, the weighed combination of the random values 503 (RNG1) and 505 (RNG2) may be obtained by:

$$out = (1-\beta) \cdot f(RNG1) + \beta \cdot f(RNG2)$$

Therefore, β operates as a weight which determines whether the static pseudo-random values 505 are to be weighed more or less than the dynamic pseudo-random values 503, according to the necessity of reproducing the same texture (or a similar texture) of the previous frame for the current frame. Note that f(RNG 1) is a function outputting values 503 while f(RNG 2) is a function outputting values 505.

In order to obtain the pseudo-random value 424 to be actually used for noise synthesis, information on the current region (e.g., block, TU, CU, CTU), may be used.

In case of large TU regions, it is possible to divide a current spatial region into subregions at stage 530 and apply J forward transforms on the pseudo-random values 505 of the second sequence, where J is the number of forward transform to be applied. Note that J equals 1 if said division of the TU into spatial subregions is not applied.

Figure 6:
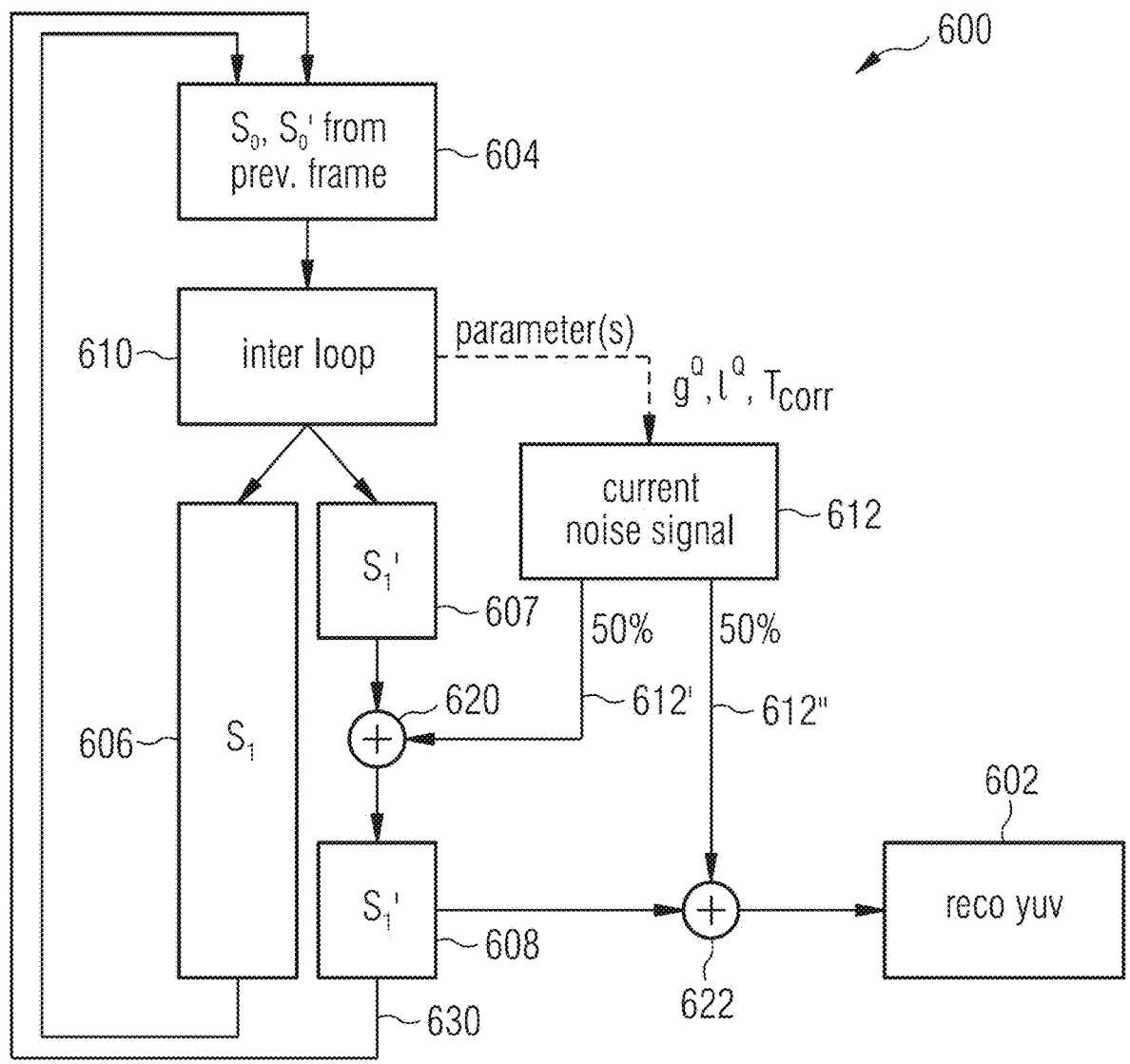
FIG. 6 shows an example of elements of the decoder cider of FIG. 4.

FIG. 6 shows a feedback-based scheme 600 for obtaining (e.g., when encoding or decoding) the video data 602, e.g., in the spatial domain (e.g., in YUV values). The method may be based on using signals $s_0$ and $s_0'$ (604) from a previous frame and deriving signals $s_1$ (606) and $S_1'$ (608) for a current frame ($s_1$ is at the encoder, while $S_1'$ is at the decoder). The apex refers to the fact that the signal is to be composed with noise (e.g., 252 in FIG. 2), while the signal without apex means the signal without noise (e.g., 238 in FIG. 2). The signals may refer, for example, to signals obtained with any of the method and/or apparatus of FIGS. 1-5. In examples, the decoder may be integrated in the encoder, so as to estimate the noise that will be actually needed.

An inter loop stage 610 (which may comprise the stages 244 and 248 of FIG. 2, for example) may be provided. At the inter loop stage 610, noise parameters such as noise energy parameter or noise level parameter (I, $I^Q$, I') and/or noise colorness parameter or granularity parameter (g, $g^Q$, g') and/or TCorr may be obtained. Element 612 may refer to the current noise signal 250 as output by the noise composer stage 240.

As can be seen from FIG. 6, noise may be added by composing a first partial component 612' (e.g., 50% or a selected percentage) of the noise signal 612 (250) to a version 607 of the signal $s_1$' (this version not having noise yet) at a first composer 620. A second partial component 612" (e.g., 50% ora selected percentage) of the noise signal 612 (250) is added at a second composer 622, to achieve the final signal 602. In examples, the sum of the first and the second component of the noise signal 612 (250) is a complete version of the noise signal.

It has been noted that it is possible to feed back (630), to the inter loop 610, the signal $s_1$' (608) only with the first component 612' of noise 612 (250) of noise.

A discussion on examples is here provided. Examples above and below may be referred to as examples of a Spectrally Adaptive Noise Filling Tool (SANFT).

A unified low-complexity alternative, operating directly within the frequency domain of conventional transform codecs, with tight coupling to the transform coefficient quantizer, is proposed. By virtue of its design, this spectrally adaptive noise filling tool (SANFT) allows for structurally and computationally efficient as well as highly input adaptive realizations by reusing the coder's existing optimized spatial and spectral partitioning algorithms.

Objective and subjective evaluation in the context of main still picture High Efficiency Video Coding (HEVC) confirms the benefits of the proposal In this work, a low-complexity unification of the film grain and texture synthesis paradigms is presented. The proposal, referred to as spectrally adaptive noise filling tool (SANFT), bears three key advantages in comparison with the state of the art. First, it avoids explicit binary segmentations of the coded image into textural and nontextural spatial areas [7], [10] or noisy and denoised portions by way of filtering [14], [16]-[19]. This minimizes the chance of limiting the visual coding quality gains due to false classifications and enables seamless scaling of the codec to visual transparency, two aspects which will be examined below. Second, as described below and above, both the analysis and synthesis algorithms are designed such that they can be implemented with very low algorithmic and architectural complexity. At the same time, the proposal allows for highly localized control over the synthesis process and, as such, precise adaptation to the instantaneous spectral and spatial properties of the input image to be coded. Third, a straightforward integration into existing image or video transform coding standards is permitted. In fact, below details an implementation of SANFT into the main still picture profile of HEVC and reports on the preparation and outcome of a formal subjective evaluation carried out to assess its visual benefit in an actual use case.

The discussion is here directed to flexible noise or texture synthesis in image coding.

A fundamental concept behind both texture and film grain reconstruction, as outlined above, is a segmentation into two components, of which one—the coarse structural portion—is coded conventionally and the other—the fine textural detail—is parameterized by the transmitter and synthesized by the receiver. A block diagram of this processing chain is depicted in FIG. 1. For both synthesis methods, the segmentation can be done via some type of denoising, followed by subtraction of the resulting image from the input to obtain a residual for estimation of the model parameters.

It is evident from FIG. 1 that the additional parametric analysis and synthesis steps act as a pre- and post-processor, respectively, to the legacy image codec (coder/decoder). This complicates both a low-complexity implementation of the parametric coding extension (since existing codec components may not be reusable) and a seamless transition towards visual transparency at very high rates (where noise/texture synthesis becomes unnecessary). In particular, the only means to decrease the amount of parametric synthesis in the decoded image at high bit-rates is to reduce the strength of the denoising algorithm close to the point where it is disabled, or by forcing potential segmentation algorithms as in, e. g., [7], [10] to classify the entire image as nontextural and/or noise-free.

To avoid these drawbacks, the following structural modification of the scheme of FIG. 1, shown in FIG. 2, is proposed. Instead of applying the denoising-synthesis pair of operations outside of, or around, the entire core codec, their execution is moved inside said codec, i. e., around the codec's quantizer. Using a transform codec like HEVC, wherein the quantization is applied to trigonometric (DCT or DST) transform coefficients, the parameter estimation as well as the noise/texture synthesis can, thus, be realized directly in the frequency domain. This, in turn, allows for a noisy/nonnoisy respectively textural/nontextural partitioning into entirely disjoint coefficient sets, which completely overlap spatially but which do not overlap spectrally. By varying the relative sizes of the two sets up to the boundary case of emptying one set (i. e., letting the other set comprise all available coefficients), a fine scalability between entirely parametric low-rate and potentially transparent waveform preserving high-rate coefficient coding can be achieved.

Furthermore, by adapting the relative set sizes spatially based on the local image characteristics, the somewhat limiting binary segmentation of the image in said prior work becomes obsolete. In other words, the denoising and/or segmentation pre-processors can be replaced by the partitioning method before or during spectral quantization.

The discussion is here directed to joint parametric partitioning and quantization.

There has been noted above the removal of fine quasi-random texture and/or noise components of an image due to coarse spectral quantization in low-bit-rate transform coding. Assuming, analogous to the film grain model, an additive structure plus texture paradigm in texture coding, a common explanation may be given as follows. Consider two disjoint quantized transform coefficient sets, $S^Q$ and $N^Q$, with $$S^Q \in T^Q, N^Q \in T^Q, S^Q \cap N^Q = \emptyset, \quad (1)$$

obtained from some local rectangular block of the input image, or a prediction residual thereof, by way of a DOT, DST, or Wavelet analysis (i. e., forward) transform. The set T of all coefficients of this transform is quantized to a reduced range of output values, or indices, yielding $T^Q$ having lower entropy than T. Hence, after the quantization, certain coefficients of $T^Q$ will have been mapped to index zero even though the respective coefficient magnitudes in T are nonzero. Let this subset of $T^Q$, whose information content is, effectively, lost through the quantization, be denoted by $N^Q$. The remaining coefficients of $T^Q$, which are not elements of $N^Q$, will all exhibit a nonzero index and, accordingly, shall form the second subset of $T^Q$, called $S^Q$. It can be observed that, at low coding bit-rates, $N^Q \approx T^Q$, $S^Q \approx \emptyset$, while at high rates, $S^Q \approx T^Q$, $N^Q \approx \emptyset$. Moreover, $N^Q$ primarily comprises HF coefficients.

The additive noise or texture models imply that the coefficients of $S^Q$, which "survive" the quantization, comprise both signal (or structure) and noise (or texture) contributions. Thus, in $S^Q$, waveform accurate coding is achieved for both of these model components. Similarly, it can be argued that, through the coefficients of $N^Q$ zeroed by the quantizer, both signal (structure) and noise (texture) information is lost. However, the variance of the image signal(s) generally exceeds the noise variance, and the image usually exhibits a low-pass spectral shape while the noise/texture is flat or high-pass shaped. As a result, at mid to high bit-rates, $N^Q$ is likely to comprise much less structural image detail than texture or film grain, which explains the denoising effect of a lossy image transform coder [15]. It can, therefore, be concluded that, at sufficient bit-rates, $N^Q$ is primarily dominated by texture or noise data and, as such, can be represented very efficiently by a parametric model that does not convey individual coefficient indices but only compactly coded descriptors of their overall statistical properties.

It is worth mentioning that an alternative countermeasure to the denoising effect would be to utilize a dithered quantizer, in which pseudo-random noise with a specified variance dependent on the quantizer's step-size is added to the coefficients of T prior to their mapping to T° (and possibly subtracted again afterwards) [21]. In the case of coarse quantization, however, this leads to more of the coefficients of $T^Q$ being nonzero, so $S^Q$ and, thereby, the entropy of $T^Q$ and the coding bit-rate increase. This solution is, therefore, impractical for low-bit-rate image or video compression.

In HEVC and other modern image and video coders, the sizes of the localized transforms, applied in a non-overlapped way to an image component (i. e., luma or chroma channel), are chosen in an input-adaptive fashion by the encoder and signalled to the decoder such that corresponding synthesis (i. e., inverse) transforms can be applied. The encoder-side search for an optimal transform block segmentation is typically performed jointly with the search for an optimal prediction by way of a rate-distortion (RD) loop, and for the sake of maximizing the coding performance, this architectural property shall be maintained. Note that, in most cases, the chosen transform sizes reflect the stationarity of the local image contents: in predictable, structurally flat regions, relatively large transform blocks are selected, whereas unpredictable, highly structured parts like nontrivial edges are coded using relatively small transforms. In the present context, where the noise/texture model parameters may be acquired separately for each transform-individual $N^Q$, one benefit of this characteristic is that the block segmentation implicitly allows for more model parameters in a nonstationary image region, where the local statistics may change from one pixel to the next, than in a quasistationary region, where the statistics may not change at all. Hence, an efficient (in a RD sense) and perceptually pleasing spatial partitioning of an image component into local $N^Q$ parameter units can be reached by simply reusing the conventional RD optimal transform block segmentation and signaling.

Analogously to the spatial partitioning, which can be achieved without any additional algorithmic operations, a low-complexity spectral partitioning of each $T^Q$ into its subsets $S^Q$ and $N^Q$ can be realized merely by letting the transform-domain quantizer "do its job". Note that the relative sizes of $S^Q$ and $N^Q$—and, thereby, the amount of denoising—can be influenced somewhat by traditional means like static or adaptive quantizer deadzone variation, whose operation does not need to be signaled to the decoder [22], [23]. A closer examination of this aspect will be provided in the following A discussion is here directed to integration and evaluation of noise filling, e.g., in HEVC. Having explained that spatial as well as spectral partitioning for input-adaptive parametric noise or texture coding extensions can be inherited from the underlying image or video codec, a low-complexity variant of the SANFT proposal is integrated into the main still picture HEVC software as follows.

An implementation of SANFT (e.g., into HEVC Reference Software) is here discussed.

In HEVC, implemented herein by a 64-bit processor-intrinsics optimized variant of the ITU/ISO/IEC test model (HM) 13.0 reference software [24], the maximum spatial partition size is given by the coding tree unit (CTU) size of 64×64 picture elements (pels), in which the largest transform unit (TU) size is 32×32 pels. Each CTU is, therefore, split into at least four TUs, and each TU can be further divided into smaller TUs using a recursive binary segmentation tree, which is signaled to the decoder. Wth this binary tree, a set of parametric model parameters can be explicitly assigned to (and transmitted for) each $N^Q$ associated with a TU after the D×D pels belonging to that TU have been analysis transformed and the resulting D×D transform coefficients have been quantized. Note that, in HEVC and its predecessors, the transform input represents a temporal or, in main still picture and "all-intra" coding, a spatial closed-loop prediction residual [3], [25] where the predictor block is derived from the decoded left and upper neighboring pels of the given D×D block.

HEVC supports a minimum TU size of 4×4 pels, allowing for high spatial parameter resolution, and for this TU size, an optional transform skip mode can be employed to bypass the analysis and synthesis transforms and use weighted identity transforms instead. Since, on average, the 4×4 TUs are the most commonly selected ones during encoding, they also contribute most dominantly to the codec's side information rate. In fact, the authors noticed that, by allowing dedicated $N^Q$ parameters for each 4×4 TU, the overhead due to SANFT coding and, thereby, the total size of the coded bit-stream grows to an unacceptable level. It is, therefore, advantageous to sacrifice some spatial resolution for reduced overall side information overhead by acquiring and transmitting only one $N^Q$ data set for each 8×8 area split into four neighboring 4×4 TUs.

Regarding the spectral partitioning into $S^Q$ and $N^Q$, it was found that, at medium and high coding rates, the overall bit-rate increase due to the SANFT parameters can be partially compensated for by adaptively increasing the quantizer's deadzone in a way similar to the optimized quantization approach in EVS audio coding [23]. In particular, by successively zeroing out higher-frequency transform coefficients initially quantized to an index magnitude of one, until a coefficient with a greater magnitude is reached (beginning at the highest frequency and ending, at the latest, at half that frequency), the number of elements in $N^Q$ can be increased. Thus, in doing so, $S^Q$—and, thereby, the bit-rate needed for entropy coding of $T^Q$—is reduced without causing visible blur (i. e., loss of structural detail) in the decoded image. Moreover, further gentle detexturizing and denoising of the coefficients in T is achieved, rendering the legacy codec-external pre-processing methods of FIG. 1 obsolete.

Having illuminated the spatiospectral integration of the SANFT proposal into the fundamental algorithmic architecture of HEVC, here after there is provided a detailed description of the SANFT analysis/encoding and decoding/synthesis procedures.

Noise parameter extraction and coding

The proposal follows the notion that natural texture, like film grain, frequently exhibits a noise-like character [8], and it extends on the parametric model utilized for frequency-domain noise filling in recent MPEG audio transform coders [26], [27]. Thus, after the QP-dependent scaling (i. e., normalization) and quantization of T resulting in $T^Q$, and the definition of $N^Q \in T^Q$, a mean noise level/is derived for each TU via the coefficients of T (after said QP-dependent scaling) located at the same spatial frequencies as the respective coefficients in $N^Q$.

$$I = \text{mean}(\text{abs}(\text{all coeffs. } c \in T \text{ for which } c^Q \in N^Q)). \tag{2}$$

Note that, for better stability of the analysis, it was found beneficial to exclude the coefficient with the lowest possible frequency (first coefficient in $T/T^Q$, i. e, the DC offset in a DCT-II) if that is included in $N^Q$, unless the employed transform is a weighted identity transform. Assuming only moderate deadzone adaptations, I will, due to the normalization of T, lie in the range between 0 and 0.5 (inclusively) for a scalar quantizer and, hence, can be directly quantized. Herein, a mapping to one of eight level indices is used:

$$I^Q = 0 \text{ if } I < 1/16, I^Q = \lfloor 9 + 2 \log_2(I) \rfloor \text{ otherwise.} \tag{3}$$

Furthermore, a single noise granularity value g is jointly obtained from all TUs in the given CTU. This second parameter represents the average spectral tilt (i. e., low-pass characteristic or coarse frequency envelope) of the coefficients in N. Herein, it is defined as $$g = \frac{\text{mean}(\text{abs}(\text{all high-frequency coeffs. } c \in T \text{ with } c^Q \in N^Q))}{1 \text{ mean}(\text{abs}(\text{all low-frequency coeffs. } c \in T \text{ with } c^Q \in N^Q))}, \tag{4}$$

i. e., a value of g=1 implies fine "white" granularity of the noise, while a value approaching g=0 indicates coarse "Brownian" granularity. Note that a factor other than 1, like 2 or 0.5, can also be used. Moreover, for very-high-resolution content where the physical limitations of the cameras become more noticeable, a constant offset of ¼ or ½ is subtracted from (4) to make the noise output appear more natural. Like I, g can be quantized straightforwardly:

$$g^Q = 4 \text{ if } g \le 0, g^Q = \lfloor 4 - 4\sqrt{\min(1,g)} \rfloor \text{ otherwise.} \tag{5}$$

The spatially localized noise parametrization via $I^Q$, $g^Q$ suffices to transmit to the decoder the key statistical properties of the film gain or textures to be reconstructed. Hence, further measures like the aforementioned skewness, kurtosis [14], [20] or AR data [16]-[19] are not required, which minimizes the bit-stream overhead.

$I^Q$ and $g^Q$, along with the QP indices, are coded differentially in horizontal and vertical direction across all CTUs and TUs. To this end, an approach very similar to that used in HEVC for delta-QP coding [3], [28], involving a mixture of mapped unary coding and context adaptive binary arithmetic coding (CABAC), is employed. FIG. 3 summarizes the individual steps in the SAN FT encoder.

Noise parameter decoding and parametric synthesis

At the receiver, the transmitted $T^Q$, $I^Q$, $g^Q$, and QP indices are subjected to entropy decoding, and in case of the latter three bit-stream elements, the two-dimensional differential (delta) coding is undone. I is then reconstructed to $0 \le I' \le 0.5$ using the decoded level index, $$I = 0 \text{ if } I^Q = 0, I' = 2^{(I^Q-9)/2} \text{ otherwise} \tag{6}$$

with the italic prime ' denoting the parameter quantization process.

From $g^Q$, a relative transform low-pass factor $0 < g' \le 1$ is derived:

$$g' = 2 - g^{Q/4}, \tag{7}$$

The actual SANFT application, i. e., noise component synthesis, in each TU is performed separately from the inverse transform of the associated $T^Q$ (whose operation is left unchanged) in four steps.

First, given the vertical and horizontal dimensions of the TU as a height h and width w, respectively, the spectral region of T to be noise filled (i. e., reconstructed parametrically) is determined:

$$N^{Q*} = \text{all coeffs. } c^Q \in N^Q \text{ at indices } h' < \lceil h \, g' \rceil, w' < \lceil w \, g' \rceil. \tag{8}$$

Note that, for g'<1, $N^{Q*}$ represents a low-pass subset of all zero-valued coefficients in $T^Q$, i. e., $N^Q$ of (1), as indicated by the star. As in the encoder-side analysis, the lowest-frequency "DC" transform coefficient of $T^Q$ is excluded from $N^Q$ if that coefficient was quantized to zero and the employed analysis transform was a DCT or DST. The coefficients in $N^{Q*}$ are now substituted with pseudo-random coefficients, e. g., randomly signed unity values as in [27] or signed results of a variance-normalized linear congruential random number generator [29], which are scaled (multiplied) by I'.

As the second step, $N^{Q*}$ is padded with zeros at the locations of the other coefficients in $T^Q$ and then subjected to the same inverse transform as that applied to $T^Q$, with the same QP value and fixed-point representation for scaling. This ensures that the synthesized spatial contents of the waveform accurate and the parametric parts are spectrally disjoint and compatibly scaled, as desired The low-pass effect of limiting the spectral support of $N^{Q*}$ via g'<1 can be more pronounced and effective than the spatial-domain AR model used in, e, g., [17] or [18] because the latter only captures the relationship among neighboring pixels within a small range [20].

The inverse transforms are applied in all TUs and CTUs covering the picture/frame and, thus, result in a temporary noise image which is eventually added to the legacy decoded, denoised image for the final reconstruction. Generating the temporary noise image instead of applying a single joint inverse transform to the TU-wise mix of $T^Q$ and $N^{Q*}$ bears two major advantages. On the one hand, it allows for HEVC's "intra" predictive coding to be undone using only the waveform-coded but not the noise filled parametric parts. Since the synthesized noise components are, by definition, uncorrelated with the input image and, thus, would lower the prediction gain quite severely, this architectural approach is highly beneficial in terms of maintaining the core transform coding efficiency. On the other hand, it enables the separate application of dedicated deblocking and deringing post-filters like [30], [31] to the temporary noise image as well as the decoded, denoised image.

In HEVC, deblocking is carried out after "intra" decoding using vertical and horizontal (in that order) conditional spatial filtering along the block boundaries at a multiple-of-8 pel location [28]. In case of strong low-passing with $g^Q > 2$ in the SANFT, notable dis-continuities tend to appear also in the temporary noise image, and they do so even at intermediate non-8×8 locations in places where 4×4 TUs are primarily used. Since the HEVC deblocking filter is designed with a certain complexity-performance trade-off in mind and a much simpler unconditional deblocking filter would suffice in case of the noise image (where every spatial discontinuity may be considered undesirable), it is reasonable to maintain the HEVC algorithm on the decoded, denoised image and to apply faster and more aggressive deblocking to the temporary noise image.

Therefore, as an optional third step applied in case of non-white noise granularity with g<1, it is proposed to apply, in vertical and then horizontal direction, a spatial two-tap smoothing filter to the noise image along the pets on each side of a TU block boundary:

$$\acute{p}_A = (5 \cdot g^Q \cdot p_B + (64 - 5 \cdot g^Q) \cdot P_A + 32) \gg 6,$$

$$\acute{p}_B = (5 \cdot g^Q \cdot p_A + (64 - 5 \cdot g^Q) \cdot P_B + 32) \gg 6, \quad (9)$$

with $p_A$ and $p_B$ being the adjacent pels (i. e., horizontal or vertical neighbors) at the edges of TU blocks A and B, respectively, and » indicating the binary right-shift operation (Video coding algorithms are typically specified using only integer arithmetic). It is easy to note in (9) that the closer $g^Q$ is to 4, the more cross-TU blending is performed in the derivation of the deblocked border values $\acute{p}_A$ and $\acute{p}_B$. Moreover, since g is fixed for the entire CTU and (9) is unconditional, the filter can be realized with low algorithmic complexity.

Having synthesized and optionally deblocked the noise component, the fourth and final step in the decoder-side SANFT method constitutes the combination of the temporary noise image with the traditionally decoded, denoised image component to complete the output picture or frame. This can simply be achieved using spatial addition or, equivalently (due to its pseudo-random nature), subtraction of the noise image. It is worth noting that a coded image is split into its luminance (luma, Y) and chrominance (chroma, U and V) components. Intuitively, SANFT processing should, thus, be applied to Y as well as U and V. However, the authors observed that the restriction of the tool to the luma channel limited both the algorithm complexity and the side information overhead without reducing the visual benefit too much. Hence, the luma-only configuration was chosen for the formal subjective evaluation, which is discussed subsequently. FIG. 4 illustrates the four steps of the SANFT decoding method in the context of HEVC.

Three more algorithmic aspects are worth mentioning. First, to save dynamic memory during SANFT decoding, the generation of a complete temporary noise image can be circumvented by storing, for each decoded CTU, only the temporary 64×64 "noise patches" of its previously decoded left, top, and top-left CTU neighbors. After deblocking has been executed on this square-of-four CTU quadruple, the SAN FT contribution of said top-left CTU neighbor is fully synthesized and can be added to the reconstructed output image (or subtracted therefrom), making space for a new patch generated when decoding the next CTU. Second, the authors discovered that, in the luma channel, the SAO post-processor [31] can be deactivated without causing significant perceptual quality reduction when $g^Q \leq 2$ and $I^Q > 0$ in at least one TU of the given CTU, since quantization-induced ringing artifacts tend to be visually masked by the noise filling. This saves a part of the bit-stream overhead utilized for the SAO parameters. Third, for a more consistent texture or film grain look across differently sized TUs, it makes sense to, as an alternative example, create the temporary noise image from only 4×4 inverse transforms even in case of larger TUs. Specifically, for any D×D-sized TU having D=8, 16, 32 or, possibly, 64, a set of $D^2/16$ square-arranged 4×4 synthesis transforms of separate $N^{Q*}$ with independently generated pseudo-random numbers (or signs) can be employed. Note that all $N^{Q*}$ in said TU share the same 4×4 $N^Q$ or a low-pass subset thereof if g>0, so $N^Q$ has to be derived from a D/14-times downsampled (in both directions) magnitude-only version of $T^Q$, i. e., $\downarrow(abs(T^Q))$.

The assessment of objective and subjective performance is here discussed.

The SANFT integration into the main still picture HEVC codec was evaluated both objectively and subjectively. To this end, the first frames of 11 full high definition (FHD) and ultra-high definition (UHD) 8-bit YUV video sequences utilized during the HEVC standardization [25], [28], [32] (classes A and B) were coded and decoded with and without the SANFT and a proprietary, visually motivated per-CTU local adaptation of the quantization parameter (OP). The global (i. e., mean) QP index was set to 37, for medium quality, and 32, for higher quality, RD optimized quantization was used, and all other coding parameters were either set to the default values of the reference software HM 13.0 [32] or, in case of activated SANFT.

For objective evaluation, complexity estimates were conducted using runtime measurements integrated directly into the HM software, bypassing any disk read and write overhead. Regardless of whether the local OP adaptation (QPA) was enabled, the decoder-side complexity overhead due to the SANFT synthesis was found to lie between one quarter, at QP 32, and one third, at OP 37, with a mean around 29%. This additional complexity requirement can be attributed to the execution of further inverse transforms for the noise filling texture. At higher QPs, inverse transforms can traditionally be skipped in numerous blocks due to the absence of nonzero spectral coefficients therein, but even for these blocks, inverse transforms has to be applied for the noise synthesis. Hence, the decoder-side complexity overhead is slightly greater at high QPs than at low QPs, Note that the mean encoder-side overhead, measured at only about one seventh of the total workload, is much lower because only noise level and shape/granularity analysis, but no SANFT decoding and extra synthesis transforms, are involved. Moreover, further algorithmic optimizations should make it possible to reduce this overhead to less than one tenth.

As a second objective aspect, the mean bit-stream size increase or, in other words, side-information overhead caused by the coded SANFT parameters was quantified. It was observed that this overhead is roughly constant across the two QP operating points and, as such, leads to a greater relative bit-stream growth at lower rates (5-6% at QP 37) than at higher rates (2.5-3% at OP 32).

The subjective evaluation was carried out using a formal visual comparison test following the methodology of ITU-R rec. BT.500 [33]. Specifically, a degradation category rating (DCR) experiment with a sequence-wise simultaneous ten-second presentation of the uncoded reference, on the left, and the coded version, on the right, assessed on a nine-grade numerical degradation scale according to Annex C and Appendix V, respectively, of ITU-T rec. P.910 [34] was performed. Each uncodedicoded image pair was, if needed, cropped to FHD resolution and depicted side-by-side horizontally on top of a mid-gray background on a color-calibrated 65-inch LG E6 OLED television. An uncoded/ uncoded hidden reference pair was shown for each sequence at random points during the test for verification purposes. Fourteen observers experienced in detecting traditional image and video coding artifacts, aged between 24 and 35 (incl. two females) participated in this study. The voting period after each ten-second stimulus pair presentation was not limited in duration in order to allow the participants to take voluntary short breaks. The viewing distance for all 14 subjects was limited to the range 3H-3.5H, with H denoting the stimulus height (0.4 m in this case, i. e., half the height of the television's UHD panel).

The mean opinion score (MOS) and associated 95% confidence interval (computed with the assumption of a student-t distribution) for each codec configuration and OP operating point is illustrated in FIG. 5. Note that all depicted values were derived using data from only 12 out of the 14 observers, since the scores of two subjects had to be post-screened (one due to an excessively low MOS of 5.36 for the hidden reference and one because of an excessively high MOS of 7.54 when averaged across all stimuli). For these 12 observers, the hidden reference reaches a MOS of 8.22 and a confidence interval of ±0.18, indicating stable and accurate grading (a score of 8 is considered the threshold of artifact perception [34]), while the four MOS values for OP 32 lie between grade 7 (perceptible, but not annoying) and grade 5 (slightly annoying), implying good overall image reconstruction quality after coding.

Regarding statistical differences between codec configurations, it can be observed that, when activating the SANFT, higher MOS values are attained at the cost of increased bit-stream sizes. When linearly connecting identical configurations at the two QPs, as in FIG. 5, and interpolating the MOS and corresponding confidence interval values along these lines, it can be concluded that at QP 32 and disabled QPA, SANFT processing increases the visual coding quality with statistical significance,
at QP 32 and inactive SANFT, the configuration with QPA significantly outperforms the one without QPA, and
at both QPs, the combination of SAN FT and QPA leads to significantly improved image quality compared to HM 13 which, in terms of coding efficiency, can be quantified via the linear interpolation as a same-quality average bit-rate reduction by 10-11% for the entire QP 37-32 range, with statistical significance defined by t-test probability p<0.05. Focusing on QP 32, it is also worth noting that the two sequences scored worst when applying conventional HEVC—ParkScene and HomelessSleeping, both rated at 4.5 and roughly 5.0 without and with QPA, respectively—benefit most from the SANFT processing (their MOS values improve by 1.0 and 1.9, respectively). The proposed noise filling approach, thus, contributes to a more balanced and input independent overall perceptual coding quality. Unfortunately, for the best-scored HEVC coded image, BasketballDrive, the reverse is true (its MOS decreases from 7.0 to 5.92, regardless of whether QPA is active). Although this is the only one of the 11 images for which a score degradation is observed, further investigations into this issue are planned as a subject for future research.

Integration for the non-intra case is here discussed. In particular, generating temporally correlated "static" textures is here discussed.

SANFT, as described earlier, can insert pseudo-random noise into decoded images/videos in spectral regions which were quantized to zero by the video codec's quantizer, wherein said noise can represent both camera noise or film grain as well as textural image/video content. In video codecs using temporal prediction, e. g., by way of motion compensation, temporally correlated "static" textural video components like the fine details of an asphalt road, which move predictably within the video images over time and which do not appear "noisy" (i.e., which do not appear temporally variant), can be represented well by temporally predicting the SANFT content of a current frame from the SANFT synthesis of a previous frame. Put differently, existing motion compensation techniques can be used to synthesize the noise to be inserted in said current frame from the noise already inserted in said previous frame (a reference frame acting as a source for the temporal prediction). This approach, however, does not always yield satisfactory results, the reason being that the motion compensation vectors (trajectories) may "jump" over time between different source regions. In particular, this may lead to unstable—and, thus, partially uncorrelated and dynamic—noise textures in spatial regions where said noise textures are supposed to appear (almost) static. Moreover, the approach does not work for video coding schemes which do not employ any temporal inter-frame prediction, such as "all-Intra" coding where each frame is coded independently.

In order to circumvent the abovementioned two issues, we propose the introduction of a so-called temporal correlation (TCorr) parameter in combination with the utilization of two fully independent (and advantageously identically distributed) pseudo-random value generators instead of only one such value generator. The first random number generator, called RNG 1, is reset to a predefined value only once every few frames (in so-called random-access pictures or tune-in points) and otherwise operates continuously (i.e., the last pseudo-random value is used to compute the next pseudo-random value). The second number generator, called RNG 2, is reset to a predefined value (advantageously, a different predefined value than that used for RNG 1) once in every single frame and, thus, outputs the same random signal in every frame. In other words, RNG 1 is a dynamic noise value generator for synthesizing temporally uncorrelated SANFT noise (similar to, e. g., traditional film grain synthesis), while RNG 2 is a static noise value generator which can be used to generate noise patterns which are temporally fully correlated. An example shall now operate as follows:

1. One integer TCorr index is used in each picture block (e. g., in each coding tree unit, CTU) and represents the temporal correlation between the given picture's content and the corresponding (i.e., collocated) content of a different picture (e.g., a previous picture) within the spatial region of said block. Hence, TCorr can, advantageously, be determined as the Pearson correlation coefficient $-1 \leq r \leq 1$ between all samples of said given picture's block and all corresponding samples of said different picture's block. For video content changing very little over time within the boundaries of a given picture block, e. g., static spatially and temporally invariant objects, r approaches a value of 1, while for spatiotemporally varying content such as rapidly moving objects or "random content" like film grain or leaves on a tree moved by strong wind, $r \leq 0$. The correlation coefficient is, advantageously, mapped to $0 \leq TCorr \leq 5$ such that, for $r \leq 0$, TCorr=0, and for r=1, TCorr=5. In order to convey this temporal correlation information to the decoder (i.e., receiver), TCorr is entropy coded (advantageously using spatial and/or temporal delta-coding techniques, see below) and transmitted by the encoder for each picture block (CTU) in which at least one non-zero SANFT noise level is present.

2. The decoder applies entropy decoding (including, advantageously, delta-decoding) so as to recover the integer TCorr index for each picture block (CTU). Since the SANFT noise levels are coded and decoded prior to the shape/ granularity and TCorr indices in each frame (or slice), the decoder can identify, like the encoder, when to decode the TCorr index (i.e., when at least one non-zero noise level was decoded for the given picture block) and when not to decode a TCorr index (i.e., when no or only zero-valued noise levels were decoded for said picture block). Note that, in the latter case of no TCorr decoding, it is useful to assign a default (e.g., predicted) TCorr value in order to simplify algorithmic operations like the advantageously applied delta-coding techniques. The decoded (or default) integer $0 \leq TCorr \leq 5$ controls the SANFT noise synthesis by defining the influence of the two random number generators as follows.

When TCorr=0 (minimum), only RNG 1 is used in the noise image synthesis.

When TCorr=5 (maximum), only RNG 2 is used in the noise image synthesis.

When TCorr=1, 2, 3, or 4, both RNG 1 and RNG 2 are used in the noise image synthesis, and a weighted average is computed between their two outputs.

This means that, the smaller the value of TCorr, the more RNG 1 dominates (i.e., is weighted strongly in) the synthesized SAN FT signal, while the larger the value of TCorr, the more RNG 2 dominates (i.e. is weighted strongly in) the SAN FT synthesis. An appropriate, reasonable relationship between the TCorr parameter and the weighted average between the RNG 1 and RNG 2 outputs is given by a linear relationship such as the following one, governed by β:

$$\text{out} = (1-\beta) \cdot f(\text{RNG1}) + \beta \cdot f(\text{RNG2}) \text{ with } \beta = \text{TCorr}/5 \quad (10)$$

Note, however, that other relationships such as quadratic or similar nonlinear functions may give visually better results. Moreover, the best weighting function may depend on the codec.

Owing to rate-distortion optimization, completely different coding block segmentations are generally determined in the encoding of different video pictures by a contemporary video coder. In codecs with bi-directional temporal prediction, such as HEVC, this is even the case for jointly coded identical images (or regions thereof), as can be observed in screen content coding applications. In order for the static RNG 2 to produce fully identical pseudo-random texture patterns in successive pictures, the pseudo-random values have to be generated in the spatial (i.e., picture) domain. However, as in case of the dynamic RNG 1, said random values can still be applied in the transform (i.e., frequency) domain in order to up-hold the SAN FT synthesis principle described earlier. This can be achieved by, in each coding unit and, associated therewith, transform unit, applying a forward (i.e., analysis) transform on the RNG 2 output associated with the spatial location and region of said coding unit and transform unit. The resulting transformed static random values can be used in the SANFT synthesis algorithm. FIG. 5 illustrates this concept.

An implementation (e.g. into HEVC reference software) is here discussed.

In contrast to the intra case, the implementation of the algorithm for inter-frame-coding involves some special modification and adjustments, since the prediction is now based on reference frames.

In the following we briefly present an overview about encoder-specific details:

It can be observed that noisy reference pictures basically cause a lower prediction gain and as a consequence thereof one would obtain a loss of coding efficiency. In order to avoid such effects and achieve nearly the same coding efficiency, the implementation rests on two reconstruction buffers for storing both the original (noise-free) reconstruction signal and the noisy reconstruction. Latter has to be available for so-called backward-adaptive tools (i.e. tools, which use neighboring content to refine the current block without signaling their parameters). But, apart from backward-adaptive tools, the entire estimation of tool and coding parameters is based on the noise-free buffer: First, the encoder determines the best mode or best tool for a specific coding unit (CU) in the sense of R-D-costs. Then the found decision is applied to the second reconstruction buffer, what can be seen as a CU-wise decoding process within the encoder search. Simultaneously, new noise parameters (level, shape/granularity, TCorr) will be calculated.

After the current frame is completely partitioned and compressed, a new noise part is added to the second reconstruction buffer according to the pre-calculated parameters. Considering that the motion compensation in the following frame will use the current reconstruction buffers, there is the effect of noise propagation. To suppress an unintended enhancement of the noise signal during the whole inter-coding process, the noise-adding is realized by a weighted summation. For this purpose, SANFT adds only one half of the calculated noise signal to the noisy reconstruction buffer. The second part will be added in the end of the encoding process when the reconstructed frames are written to the hard disk or displayed. In other words, within the inter loop the algorithm takes only 50% of each noise signal into consideration. Note that this ratio can be changed, e.g. the contribution within the inter loop could be varied between 0 and 100 percent. FIG. 6 shows a flow diagram illustrating the SANFT operation in inter-frame-coding.

A further aspect of the implementation concerns the periodic reset of internal parameters, which is important for a flexible and stable decoding functionality. More precisely, in the case of transmission errors, the algorithm should guarantee periodic points, whose decoding does not depend on previous frames (cf. intra period). Therefore, SANFT resets the dynamic seed periodically to the initial value 0.

Note that all mentioned techniques regarding weighted noise summation and dynamic seed reset are analogously implemented on the decoder side. The implementation differs only in the existence of a second reconstruction buffer. Since the analysis was done by the encoder, a noise-free buffer becomes redundant for the decoder.

Coding and prediction of tool parameters for inter case are here discussed. In particular, a temporal prediction of SANFT parameters is here discussed.

Similar to other video coding tools, SANFT provides a spatial and a temporal prediction method for its parameters (level, shape/granularity, TCorr). The spatial prediction depends on the respective SANFT parameter values in neighboring CUs and, in some cases, on CTUs and follows conventional techniques used e.g. in the coding of delta-QP values [3], [28].

For usual video sequences, the shape/granularity parameter and the temporal correlation TCorr do not vary significantly from frame to frame. Therefore, in the majority of cases, the spatial prediction is not as powerful as temporal prediction. Since shape/granularity and TCorr are CTU-based parameters, the temporal prediction simply takes the respective values from the same CTU, but from a previously encoded frame. More precisely, for each temporal layer there is a separate predictor to use different values in different layers. This leads to a more efficient prediction than just taking the last encoded frame. The temporal prediction for the noise levels is structurally identical, but levels depend on the partitioning depth and, in general, there is more than one level per CTU. SANFT circumvent this issue by calculating the level average on each CTU, which yields a convenient and partition-independent value for prediction purposes. However, calculating the average is only one approach among further possibilities: calculating the maximum over all level, minimum over all levels or (min+max)/2. Having a prior averaged level, each SANFT level in a CTU is predicted by this.

The decision on the prediction mode is made frame-wise (or slice-wise), i.e. we iterate over all CTUs and calculate the exact rates or approximate them. Then the entire frame/slice is either coded using spatial prediction or temporal prediction, where the selected mode is signaled with one bit per frame/slice.

As already mentioned, SANFT has to reset internal states periodically for decoder stability and robustness. Thus, temporal prediction is disabled for these special frames and only spatial prediction is applied. Another solution would be to allow temporal prediction, but instead of drawing on prior values the prediction uses pre-defined initial values for all three parameter types.

Advantageous methods for the transmission of SANFT Parameters are here discussed.

The SANFT parameters (levels, shape/granularity, and TCorr) are transmitted with a specific priority. Specifically, in each frame/slice, the CU-wise levels are written to the bitstream and read from the bitstream first. For very small CUs/TUs, the levels of adjacent CUs/TUs within a certain rectangular spatial region are combined (e.g., averaged), and only the combined, single level is written and read. Then, in the decoder, said combined value will be assigned to all CUs/TUs within said rectangular spatial region so that the remaining SANFT algorithms can operate per TU, as usual. This reduces the SANFT signaling overhead. During the writing/reading of the SAN FT level parameters in each CTU, the number of non-zero-valued levels is counted. If this number is larger than zero, this means that SANFT synthesis will be performed at least somewhere in said CTU, so the shape/granularity and TCorr parameters will also be written/read at the end of the bitstream part associated with said CTU. If the number of non-zero levels is zero, no SANFT will be applied in the CTU, and so no shape and TCorr parameters are written/read (instead, "default" predicted values are to be assumed in the further coding/decoding and processing). The above method adds the SANFT bitstream parameters inside the existing image or video codec bitstream syntax, i.e., as an integral part of said image or video codec. An alternative approach is to write and read the SANFT parameters as a bitstream extension element, e.g., as a so-called supplemental enhancement information (SEI) message. Using this approach, all SANFT parameters for a picture/frame are written and read after all other existing syntax elements, i.e., they are appended to the legacy bitstream (which, thus, remains backward-compatible) and their entropy coding remains fully independent of the entropy coding of all legacy bitstream elements (e.g., independent CABAC context states and predictors are used for the entropy coding of the legacy bitstream elements and of the SANFT parameters).

Some conclusions are here provided. This paper examined the issue of reduced film grain or textural detail in images and videos after lossy compression using modern predictive transform coders like HEVC. As an alternative to, and unification of, conventional parametric film grain and texture synthesis methods, a frequency-domain codec extension referred to as spectrally adaptive noise filling tool (SANFT), operating as closely around the cadet's transform coefficient quantizer as possible, was derived. Its key benefit over prior work is its low complexity, achieved by an efficient reuse of existing coder algorithms, and its ability to partition the coded transform coefficients into two fully disjoint sets: a traditionally coded "waveform accurate" one and a SANFT-coded parametric one A formal DCR test using the main still picture HEVC profile indicates, for some input, visual quality gains of almost two points on the 9-grade scale due to the SANFT Some additional examples are here provided. Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer. A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

Aspects of the examples above are here reported:

1. Image or video decoder for decoding an encoded image or video signal, configured to, in the decoding, obtain, from the encoded image or video signal, a noise level parameter and a noise granularity parameter, obtain, from the encoded image or video signal, a set $T^Q$ of quantized zero-valued or nonzero-valued transform coefficients, define a subset $N^{Q*} \in T^Q$, comprising zero-valued coefficients of $T^Q$, subject $T^Q$ to one or more inverse transforms to obtain an inversely transformed $T^Q$ generate and scale pseudo-random coefficients to obtain scaled pseudo-random coefficients, fill $N^{Q*}$ with the scaled pseudo-random coefficients to obtain a filled $N^{Q*}$, subject the filled $N^{Q*}$ to one or more inverse transforms to obtain an inversely transformed $N^{Q*}$, apply optional post-processing to the inversely transformed $T^Q$ or to the inversely transformed $N^{Q*}$, and mix the inversely transformed and optionally post-processed $N^{Q*}$ and the inversely transformed and optionally post-processed $T^Q$, to obtain the decoded image or video signal, wherein the scaling of the pseudo-random coefficients depends on the noise level parameter, and the definition and/or filling of the subset $N^{Q*}$ depends on the noise granularity parameter.

2. Decoder according to aspect 1, wherein the encoded image or video signal is a bit-stream and wherein the noise level parameter and noise granularity parameter are encoded as parts of the bit-stream.

3. Decoder according to aspect 1 or 2, wherein the one or more inverse transforms are discrete cosine transforms or discrete sine transforms or weighted identity transforms.

4. Decoder according to any of aspects 1-3, wherein the pseudo-random coefficients exhibit constant magnitude but varying signs.

5. Decoder according to any of aspects 1-4, wherein the optional post-processing includes spatially or temporally predictive decoding and/or spatial or temporal filtering.

6. Decoder according to any of aspects 1-5, wherein the combination of the inversely transformed and optionally post-processed $N^{Q*}$ and the inversely transformed and optionally post-processed $T^Q$ comprises a component-wise addition or subtraction.

7. Decoder according to any of aspects 1-6, wherein multiple instances of $T^Q$ or $N^{Q*}$ obtain the same noise level or noise granularity parameter.

Notably, "one or more inverse transforms" may be understood, in some examples, as a generalization to cover both a multi-transform processing and an alternative example described above, in which large inverse transformations are divided into several small ones.

Further, "weighted identity transforms" may be understood, in some examples, as a generalization of the transform skip operation in HEVC and other codecs, wherein the synthesis transformation is skipped in at least one spatial direction, but a certain coefficient weighting is maintained, Further, "spatially or temporally predictive decoding" may be understood, in some examples, as a generic term for the intra- or inter-prediction decoding [3], [25], [28] in HEVC and other codecs as well as their possible modifications (e. g. inpainted or affine prediction) or combinations, Further, "spatial or temporal filtering" may be understood, in some examples as a generic term for deblocking filtering or shape adaptive offset filtering [30], [31] in HEVC and other codecs as well as their possible modifications (e. g. with application in a temporal direction) or combinations, In general: generalizable to non-square $D_1 \times D_2$ transformations, special case $N^{Q*}=N^Q$.

8. Image or video encoder for generating an encoded image or video signal from an input image or video signal, configured to, in the encoding, obtain a set R of spatial samples from the input image or video signal or a pre-processed version of the input image or video signal, subject R to one or more analysis transforms to obtain a set T of transform coefficients, quantize the transform coefficients in T to obtain a set $T^Q$ of quantized zero-valued or nonzero-valued transform coefficients, obtain a subset $N^Q \in T^Q$, comprising zero-valued coefficients of $T^Q$, calculate a noise level parameter and a noise granularity parameter for the zero-valued coefficients in $N^Q$, encode and combine the set $T^Q$, the noise level parameter, and the noise granularity parameter, to generate the encoded image or video signal, wherein the calculation of the noise level parameter and the noise granularity parameter for the zero-valued coefficients in $N^Q$ depends on T.

9. Encoder according to aspect 8, wherein the optional pre-processing includes spatially or temporally predictive encoding and/or spatial or temporal filtering, and wherein the set R comprises spatial samples of a prediction residual and/or filter result.

10. Encoder according to aspect 8 or 9, wherein the one or more analysis transforms are discrete cosine transforms or discrete sine transforms or weighted identity transforms.

11. Encoder according to any of aspects 8-10, wherein the calculation of the noise level parameter for the zero-valued coefficients in $N^Q$ depends on the corresponding subset of transform coefficients in T, associated with the same frequencies as the zero-valued coefficients in $N^Q$.

12. Encoder according to any of aspects 8-11, wherein the encoding and combining of the set $T^Q$, the noise level parameter, and the noise granularity parameter includes direct or indirect (i, e., delta) entropy coding and multiplexing.

13. Encoder according to any of aspects 8-12, wherein multiple instances of $T^Q$ or $N^Q$ share the same noise level or noise granularity parameter.

Notably, "spatially or temporally predictive encoding" may be understood, in some examples, as a generic term for intra- or inter-prediction coding [3], [25], [28] in HEVC and other codecs as well as their possible modifications (e. g. inpainted or affine prediction) or combinations, Further, "spatial or temporal filtering" may be understood, in some examples, as a generic term for denoising pre-processing or shape adaptive offset pre-processing [14], [18], [31] in HEVC and other codecs as well as their possible modifications (e. g. with application in a temporal direction) or combinations, Further, "one or more analysis transforms" may be understood, in some examples, as a generalization to cover both multi-transform processing and splitting the two-dimensional analysis transformation into two separate "horizontal" and "vertical" 1D transformations, Further, "weighted identity transforms" may be understood, in some examples, as a generalization of the transform skip operation in HEVC and other codecs, wherein the analysis transformation is skipped in at least one spatial direction, but a certain coefficient weighting is maintained, Further, "direct or indirect entropy coding" may be understood, in some examples, as a short description for the direct arithmetic coding, range coding or Huffman coding of the quantized transform coefficients in $T^Q$ or the quantized SANFT parameters as well as the indirect arithmetic coding, range coding or Huffman (delta) coding of, e. g., differences between, or prediction errors of, coefficients in $T^Q$ or SANFT parameters, In general: generalizable to non-square D1×D2 transformations, use of coefficient subsets in (2), cf. FIG. 3.

The figures may refer to:

FIG. 1. Conventional parametric image or video coding with spatial-domain pre-processor and noise or texture synthesis as post-processor around a codec.

FIG. 2. Proposed modification to the diagram of FIG. 1 with spectral-domain parametric analysis and synthesis in the context of a modern transform codec.

FIG. 3. SANFT level and granularity parameter extraction in the transform domain. Note: the lowest-frequency coefficient is excluded from the analysis.

FIG. 4. SANFT spectral synthesis, spatial deblocking (optional), and spatial mixing after intra-predictive decoding within the image's luminance channel.

FIG. 5. Operation of the random value generators in the SANFT synthesis.

FIG. 6. Flow diagram illustrating the SANFT operation in inter-frame-coding.

Even if the drawings are referred to stages of the invention (e.g., elements of hardware and programming to obtain predetermined functions), they may also be understood as describing corresponding methods (e.g. each block corresponding to a related method step).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Int. Telecommunication Union (ITU), CCITT, Specification T.81, "Information Technology—Digital Compression and Coding of Continuous—Tone Still Images—Requirements and Guidelines," Geneva, Switzerland, September1992.

[2] T. Ebrahimi et al., "Overview and Benchmarking Summary for the ICIP 2016 Compression Challenge," in *Proc. IEEE Int. Conf. Image Process. (ICIP)*, Phoenix, USA, September 2016.

[3] ITU-T, Recommendation H.265 and ISO/IEC, Int. Standard 23008-2, "High efficiency video coding," Geneva, Switzerland, January 2017, online: http://www.itu.int/rec/T-REC-H.265

[4] T. Ebrahimi et al., "Summary and Next Steps for the Image Compression Challenge," in Proc. *IEEE Int, Conf Image Process. (ICIP)*, Phoenix, USA, September 2016.

[5] P. Campisi, D. Hatzinakos, and A. Neri, "A Perceptually Lossless, Model-Based, Texture Compression," *IEEE Trans, image Process., vol.* 9, no. 8, pp 1325-1336, August 2000.

[6] P. Ndjiki-Nya, B. Makai, G. Blattermann, A. Smolic, H. Schwarz, and T. Wiegand, "Improved H.264/AVC Coding Using Texture Analysis and Synthesis," in *Proc. IEEE Int, Conf. Image Process. (ICIP)*, vol. 3, pp. 849-852, September 2003.

[7] A. Dumitras and B. G. Haskell, "An Encoder-Decoder Texture Replacement Method With Application to Content-Based Movie Coding," *IEEE Trans. Circuits Syst. for Video Technology*, vol. 14, no. 6, pp. 825-840, June 2004.

[8] J. Ballé, B. Jurczyk, and A. Stojanovic, "Component-Based Image Coding Using Non-Local Means Filtering and an Autoregressive Texture Model," in *Proc. IEEE ICIP*, Cairo, Egypt, pp. 1937-1940, November 2009.

[9] B. T. Oh, Y. Su, C. A. Segall, and C.-C. J. Kuo, "Synthesis-Based Texture Video Coding with Side Information," *IEEE Trans, Circuits & Syst. for Video Technology*, vol. 21, no. 5, pp. 647-659, May 2011.

[10] J. Ballé, A. Stojanovic, and J.-R. Ohm, "Models for Static and Dynamic Texture Synthesis in Image and Video Compression," *IEEE J. Sel. Topics in Signal Process.*, vol. 5, no. 7, pp. 1353-1365, November 2011.

[11] B. Zhou, F. Zhang, and L. Peng, "Compact Representation for Dynamic Texture Video Coding Using Tensor Method," *IEEE Trans. Circuits & Syst. for Video Technology*, vol. 23, no. 2, pp. 280-288, February 2013.

[12] H. Xu, H. Zha, and M. A. Davenpot, "Manifold Based Dynamic Texture Synthesis from Extremely Few Samples," in *Proc. IEEE Conf. Computer Vision and Pattern Recognition*, Columbus, USA, pp. 3019-3026, June 2014.

[13] K. Naser, V. Ricordel, and P. Le Callet, "Local Texture Synthesis: A Static Texture Coding Algorithm Fully Compatible With HEVC," in *Proc. IEEE Int. Conf. Syst., Signals, Image Process. (IWSSIP)*, London, UK, pp. 37-40, September 2015.

[14] J, C. K. Yan, P. Campisi, and D. Hatzinakos, "Film Grain Noise Removal and Generation for Color Images," in *Proc. IEEE Int. Conf. Acoust., Speech, Signal Process. (ICASSP)*, Seattle, USA, vol. 5, pp. 2957-2960, May 1998.

[15] O. K. Al-Shaykh and R. M. Mersereau, "Lossy Compression of Noisy Images," *IEEE Trans. Image Process.*, vol, 7, no. 12, pp, 1641-1652, December 1998.

[16] C. Gomila and A. Kobilansky, "SEI message for film grain noise," *Proc. 8th Meeting Joint Video Team*, doc. JVT-H022, Geneva, Switzerland, pp. 1-14, May 2003.

[17] B. T. Oh, C.-C. J. Kuo, S. Sun, and S.-M. Lei, "Film Grain Noise Modeling in Advanced Video Coding," *IEEE Trans. Circuits & Syst. for Video Technology*, vol. 19, no. 12, pp. 1717-1729, December 2009.

[18] J. Dai, O. C. Au, C. Pang, W. Yang, and F. Zou, "Film Grain Noise Removal and Synthesis in Video Coding," in *Proc. IEEE Int. Conf. Acoust., Speech, Signal Process. (ICASSP)*, Dallas, USA, pp. 890-893, March 2010.

[19] I. Hwang, J. Jeong, J. Choi, and Y. Choe, "Enhanced Film Grain Noise Removal for High Fidelity Video Coding," in *Proc. IEEE Int. Conf. Inform. Science Cloud Comput. Comp. (ISCC-C)*, Guangzhou, China, pp. 668-674, December 2013.

[20] T. Sun, L. Liang, K. H. Chiu, P. Wan, and 0. C. Au, "DCT Coefficients Generation Model for Film Grain Noise and Its Application in Super-Resolution," in *Proc, IEEE Int. Conf. Image Process. (ICIP)*, Paris, Fr., pp. 3857-3861, October 2014.

[21] S. P. Lipshitz, R. A. Wannamaker, and J. Vanderkooy, "Quantization and Dither: A Theoretical Survey," *J. Aud. Eng. Soc.*, vol. 40, no. 5, pp. 355-375, May 1992,

[22] G. J. Sullivan, "Efficient Scalar Quantization of Exponential and Laplacian Random Variables," *IEEE Trans. Inf Theory*, vol. 42, no. 5, pp. 1365-1374, September 1996.

[23] G. Fuchs, C. R. Helmrich, G. Marković, M. Neusinger, E. Ravelli, and T. Moriya, "Low Delay LPC and MDCT-Based Audio Coding in the EVS Codec," in *Proc. IEEE Int. Conf. Acoust., Speech, Signal Process. (ICASSP)*, Brisbane, Australia, pp. 5723-5727, April 2015.

[24] I.-K. Kim et al., "HEVC Test Model 13 (HM 13) Encoder Description," JCTVC-O1002 and m31757, Geneva, 2013.

[25] J. Lainema, F. Bossen, W.-J. Han, J. Min, and K. Ugur, "Intra Coding of the HEVC Standard," *IEEE Trans. Circuits Syst. for Video Technology*, vol. 22, no. 12, pp. 1792-1801, 2012.

[26] ISO/IEC, Int. Standard 23003-3, "Information technology—MPEG audio technologies—Part 3: Unified speech and audio coding," Geneva, Switzerland, January 2012.

[27] C. Helmrich, A. Niedermeier, S. Bayer, and B. Edler, "Low-Complexity Semi-Parametric Joint-Stereo Audio Transform Coding," in *Proc. EURASIP European Signal Process. Conf. (EUSIPCO)*, Nice, France, pp. 794-798, September 2015.

[28] V. Sze, M. Budagavi, and G. J. Sullivan, *High Efficiency Video Coding (HEVC)—Algorithms and Architectures*, Cham Switzerland: Springer International Publishing, 2014.

[29] D. E. Knuth, *The Art of Computer Programming, Volume 2: Seminumerical Algorithms*, 3$^{rd}$ ed., Addison-Wesley, 1997.

[30] A. Norkin, G. Bjøntegaard, A. Fuldseth, M. Narroschke, M. Ikeda, K. Andersson, M. Zhou, and G. v. d. Auwera, "HEVC Deblocking Filter," *IEEE Trans, Circuits & Syst. for Video Technology*, vol. 22, no. 12, pp. 1746-1754, December 2012.

[31] C.-M. Fu, E. Alshina, A. Alshin, Y. Huang, C. Chen, C. Tsai, C. Hsu, S. Lei, J. Park, and W.-J. Han, "Sample Adaptive Offset in the HEVC Standard," *IEEE Trans. Circuits & Syst. for Video Technology*, vol. 22, no. 12, pp. 1755-1764, 2012.

[32] F. Bossen, "Common test conditions and software reference configurations," JCTVC-L1100 and m28412, Geneva, 2013.

[33] ITU-R, Recommendation BT.500, "Methodology for the subjective assessment of the quality of television pictures," Geneva, Switzerland, January 2012.

[34] ITU-T, Recommendation P.910, "Subjective video quality assessment methods for multimedia applications," Geneva, Switzerland, April 2008.

The invention claimed is:

1. An encoder apparatus for encoding a picture into a data stream, configured to:
   subject a transform of a block of the picture to quantization to acquire a quantized transform;
   determine a zero-quantized portion of the quantized transform;
   define a second block having coefficients of the transform associated to the zero-quantized portion of the quantized transform;
   determine at least one noise parameter providing noise information on the transform within second block;
   signal the quantized transform and the at least one noise parameter, wherein the encoder apparatus is configured to:
   divide the second block into a higher-frequency zero-quantized portion and a lower-frequency zero-quantized portion; and
   determine a noise colorness parameter or granularity parameter on the basis of a comparison and/or a relationship and/or a quotient based on:
      a first sum or aggregate value or statistical value or average value associated to the transform within the higher-frequency zero-quantized portion; and
      a second sum or aggregate value or statistical value or average value associated to the transform within the second block or within a super block comprising the block.

2. The encoder apparatus of claim 1, configured to:
   determine a noise energy parameter or noise level parameter, comprised in the at least one noise parameter, associated to the transform within the second block.

3. The encoder apparatus of claim 2, configured to:
   determine the noise energy parameter or noise level parameter by performing averaging, aggregating, and/or acquiring measured values and/or estimated values and/or statistical values associated to the transform within the second block.

4. The encoder apparatus of claim 1, further configured to:
   determine the noise colorness parameter or granularity parameter on the basis of a spectral tilt value or low-pass characteristic associated to the noise of the transform within the second block.

5. The encoder apparatus of claim 1, configured to:
   determine the noise colorness parameter or granularity parameter between at least:
      a first value associated to Brownian colorness or granularity; and
      a second value associated to white colorness or granularity.

6. The encoder apparatus of claim 1, configured to:
   exclude at least the lowest frequency from the second block.

7. The encoder apparatus of claim 1, configured to:
   perform a first determination to determine a noise colorness parameter or granularity parameter describing colorness or granularity of noise of the transform within the second block;
   perform second determinations to determine a noise energy parameter or noise level parameter associated to the transform within the second block,
   wherein each of the second determinations is performed for one block of a group of blocks and the first determination is performed for the entire group of blocks,
   so as to associate an energy parameter or noise level parameter to each block of the plurality of blocks, and
   to associate one noise colorness parameter or granularity parameter to the entire group of blocks.

8. A decoder apparatus for decoding a picture from a data stream, configured to:
   derive a quantized transform from the data stream, a zero-quantized portion of the quantized transform, and at least one noise parameter providing noise information for a transform in the positions of the zero-quantized portion;

provide noise synthesis to synthesize noise associated with the quantized transform on the basis of the at least one noise parameter; and reconstruct the picture using the quantized transform and the synthesized noise, wherein the decoder apparatus is configured to:

define at least one frequency boundary on the basis of a noise colorness parameter or granularity parameter describing colorness or granularity of noise of the transform in the positions of the zero-quantized portion, the noise colorness parameter or granularity parameter being comprised in the at least one noise parameter;

determine, from the zero-quantized portion, a higher-frequency zero-value subportion and a lower-frequency zero-value subportion; and set at zero the noise for the higher-frequency zero-value subportion and/or avoid noise insertion for the higher-frequency zero-value subportion and/or prevent from synthesizing noise for the higher-frequency zero-value subportion.

9. The decoder apparatus of claim 8, configured to:

define a subportion of the zero-quantized portion on the basis of the at least one noise parameter, the at least one noise parameter comprising a noise colorness parameter or granularity parameter describing colorness or granularity of noise of the transform in the positions of the zero-quantized portion.

10. The decoder apparatus of claim 8, configured to:

provide the noise synthesis by generating noise in the positions of the subportion of the zero-quantized portion.

11. The decoder apparatus of claim 8, configured to:

provide the noise synthesis by inserting pseudo-random values conditioned by a noise energy parameter or noise level parameter comprised in the at least one noise parameter.

12. The decoder apparatus of claim 8, configured to:

synthesize noise on the basis of the at least one noise energy parameter or noise level parameter in such a way that the intensity of the noise inserted into the positions of the zero-quantized portion is comparatively increased for a comparatively increased noise energy or noise level of the transform.

13. The decoder apparatus of claim 8, configured to:

cut frequencies, in the positions of the zero-quantized portion, higher than a frequency threshold defined on the basis of a noise colorness parameter or granularity parameter describing colorness or granularity of noise of the transform in the positions of the zero-quantized portion, the noise colorness parameter or granularity parameter being comprised in the at least one noise parameter, so that the frequency threshold is comparatively higher for noise which is whiter than for noise which is less white noise.

14. An encoding method, comprising:

quantizing a transform of a block of a picture to acquire a quantized transform;

defining a second block having coefficients of the transform associated to a zero-quantized portion of the quantized transform;

acquiring at least one noise parameter providing noise information on the transform within the zero-quantized portion;

signal the quantized transform and the at least one noise parameter, wherein the method comprises:

dividing the second block into a higher-frequency zero-quantized portion and a lower-frequency zero-quantized portion; and determining the noise colorness parameter or granularity parameter on the basis of a comparison and/or a relationship and/or a quotient based on:

a first sum or aggregate value or statistical value or average value associated to the transform within the higher-frequency zero-quantized portion; and a second sum or aggregate value or statistical value or average value associated to the transform within the second block or within a super block comprising the block.

15. A decoding method, comprising:

acquiring a quantized transform from a data stream, a zero-quantized portion of the quantized transform, and at least one noise parameter providing noise information for the zero-quantized portion;

performing noise synthesis associated with the quantized transform on the basis of the at least one noise parameter; and reconstructing a picture using the quantized transform and the synthesized noise, wherein the method further comprises:

defining at least one frequency boundary on the basis of a noise colorness parameter or granularity parameter describing colorness or granularity of noise of a transform in the positions of the zero-quantized portion, the noise colorness parameter or granularity parameter being comprised in the at least one noise parameter;

determining, from the zero-quantized portion, a higher-frequency zero-value subportion and a lower-frequency zero-value subportion; and setting at zero the noise for the higher-frequency zero-value subportion and/or avoid noise insertion for the higher-frequency zero-value subportion and/or prevent from synthesizing noise for the higher-frequency zero-value subportion.

* * * * *